(12) United States Patent
Semba

(10) Patent No.: US 8,549,599 B2
(45) Date of Patent: Oct. 1, 2013

(54) FINGERPRINT AUTHENTICATION SERVER, CLIENT COMPUTER AND FINGERPRINT AUTHENTICATION METHOD

(75) Inventor: Satoshi Semba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/200,943

(22) Filed: Oct. 5, 2011

(65) Prior Publication Data

US 2012/0030743 A1 Feb. 2, 2012

Related U.S. Application Data

(63) Continuation of application No. PCT/JP2009/057267, filed on Apr. 9, 2009.

(51) Int. Cl.
*H04L 9/32* (2006.01)

(52) U.S. Cl.
USPC .............................................. 726/7; 713/186

(58) Field of Classification Search
USPC ............................................ 726/7; 713/186
See application file for complete search history.

(56) References Cited

U.S. PATENT DOCUMENTS

| | | | |
|---|---|---|---|
| 6,751,734 | B1 | 6/2004 | Uchida |
| 6,931,539 | B2 * | 8/2005 | Walia ............................. 713/186 |
| 7,260,724 | B1 * | 8/2007 | Dickinson et al. ............ 713/182 |
| 2003/0037004 | A1 | 2/2003 | Buffum et al. |
| 2004/0123127 | A1 * | 6/2004 | Teicher et al. ................ 713/193 |
| 2006/0153428 | A1 | 7/2006 | Yoshiura |
| 2008/0031496 | A1 | 2/2008 | Takagi |
| 2008/0209227 | A1 * | 8/2008 | Venkatesan et al. .......... 713/186 |

FOREIGN PATENT DOCUMENTS

| | | |
|---|---|---|
| JP | 11-353281 | 12/1999 |
| JP | 2000-276445 | 10/2000 |
| JP | 2001-256191 | 9/2001 |
| JP | 2003-132023 | 5/2003 |
| JP | 2006-195640 | 7/2006 |
| JP | 2008-10016 | 1/2008 |
| JP | 2009-26235 | 2/2009 |

OTHER PUBLICATIONS

Sutcu et al., "A Secure Biometric Authentication Scheme Based on Robust Hashing", Aug. 1-2, 2005, ACM, pp. 111-116.*
Le et al., "A Codeword-based Indexing Scheme for Fingerprint Identification", 2008, IEEE, pp. 1352-1356.*
International Search Report for PCT/JP2009/057267 mailed Oct. 20, 2011.
Extended European Search Report issued Dec. 20, 2012, in corresponding European Patent Application No. 09843016.8.

\* cited by examiner

*Primary Examiner* — Matthew Smithers
(74) *Attorney, Agent, or Firm* — Staas & Halsey

(57) ABSTRACT

A fingerprint authentication server device is disclosed. The fingerprint authentication server device includes a database in which user IDs and the registered fingerprint data of plural users are stored; and a hash value table including user hash values of the user IDs and the registered fingerprint data of the users. The fingerprint authentication server device is configured to receive a hash value of a user ID of a user to be authenticated and a hash value of registered fingerprint data associated with the user ID from a client computer; perform a search in the hash value table to determine whether there are hash values corresponding to the received hash values in the hash value table; and transmit a determination result to the client computer, thereby to cause the client computer to perform a fingerprint authentication process for a user for which correspondence of the hash values has been confirmed.

12 Claims, 22 Drawing Sheets

| USER ID | REGISTERED FINGERPRINT DATA |
|---------|------------------------------|
| syamada | BINARY DATA (A FEW KB) |
| twatanabe | BINARY DATA (A FEW KB) |
| ssuzuki | BINARY DATA (A FEW KB) |
| ⋮ | ⋮ |

FIG.4

| ORDER | USER ID HASH VALUE | REGISTERED FINGERPRINT DATA HASH VALUE |
|---|---|---|
| 1 | 2262CFBA815F04F18F722A3990246FCFE37324CD86DA3CF4B650D1A8CB5321AE | 075D705E37183AE33AD123BEFFF7200D23C65C65222CFBA815F04F18F722A39 |
| 2 | 2D5CD350C7A48263C670A6374C5C55BCA8D1A68AF18F722A3990246FCFE37324 | 85E166DAC6CA5836B50696C29CF55E0EA2F8D56448263C670A6374C5C55BCA8D |
| 3 | 3E4E768CCA1EB889C8A24FEF2AC53031966834FD350C7A48263C670A4141712 | B924DCEAA380E2F4431CF376EBC5D364EE59D9DB6A3CFF137D3D0BA0890DDAAC |
| 4 | 42496C4380199409E2CD5C6907A8F586D4E221FCF5941D30B8D850C887A5CFF | D6452850AD796EA6E469FD8E5DF71962BCF21F64759A10D5D03824DED5FFF137 |
| 5 | 62852FD6B864DF67AC184160E834FFFE161455EE96B9B76324B96B41417123AA | 09108BB67F1178C7C810BAD53AFF77B6E7C557C5FD918E9D04ADA6A3CFF137D3 |
| 6 | 796B9B76324B96B41417123EC22BAECAE4A88978CCA1EB889C8A24FEF2AC530 | EB3414FD918E9D04ADA6A3CFF137D3D0BA0890DDC5D364EE59D9DB6A3CFF137D |
| 7 | 9C8FBABB4AA369DB1E43B7FE437FFC976CB9E71E262CFBA815F04F18F722A399 | 6B4BA0EF4917AF3194399D5C7F646EFADD2D05CD33AD123BEFFF7200D23C65C6 |
| 8 | C82B6B6F2059DCDB3B2076B2AF2CA81901AED3A489C8A24FEF2AC53031966834 | 3449EDCA6759A10D5D03824DED5F3A7F41D8CF5304ADA6A3CFF137D3D0BA0890 |
| 9 | CAD53FDA7DCF5941D30B8D850C887A517FC98BFA369DB1E43B7FE437FFC976CB | 1E18BD9E5273F81E237FE34CE41F4F2D3061E1180EF4917AF3194B99D5C7F646 |
| 10 | D5E0757FC8B3FB44BA92D8927E021773C695608141417230EC22BAECAE4A889 | D09382B2F25FD80866D4FDA858F0B3AD264BB96AA369DB1E43B7FE437FFC976 |
| ... | ... | ... |

| LEADING NUMERICAL VALUE | HASH VALUE NUMBER |
|---|---|
| 0000 | 0 |
| 0001 | 215 |
| 0002 | 441 |
| 0003 | 736 |
| 0004 | 1081 |
| 0005 | 1292 |
| : | : |
| FFF8 | 689254 |
| FFF9 | 689488 |
| FFFA | 689800 |
| FFFB | 690054 |
| FFFC | 690249 |
| FFFD | 690545 |
| FFFE | 690789 |
| FFFF | 691044 |

| ORDER | USER ID HASH VALUE | REGISTERED MINUTIAE DATA HASH VALUE |
|---|---|---|
| 1 | 2262CFBA815F04F18F722A3990246FCFE37324CD86DA3CF4B650D1A8CB5321AE | 075D705E37183AE33AD123BEFFF7200D23C65C652262CFBA815F04F18F722A39 |
| 2 | 2D5CD350C7A48263C670A6374C5C55BCA8D1A68AF18F722A3990246FCFE37324 | 85E166DAC6CA5836B50696C29CF55E0EA2F8D564482 63C670A6374C5C55BCA8D |
| 3 | 3E4E768CCA1EB889C8A24FEF2AC53031966834 8FD350C7A48263C670A41417 12 | B924DCEAA380E2F4431CF376EBC5D364EE59D9DB6A3CFF137D3D0BA0890DDAAC |
| 4 | 42496C43801994089E2CD5C6907A8F586D4E221FCF5941D30B8D850C887A5CFF | D6452850AD796EA6E469FD8E5DF71962BCF21F64759A10D5D03824DED5FFF137 |
| 5 | 62852FD6B864DF67AC184160E834FFFE161455EEE96B9B76324B96B41417123AA | 09108BB67F1178C7C810BAD53AFF77B6E7C557C5FD918E9D04ADA6A3CFF137D3 |
| 6 | 796B9B76324B96B41417 1230EC22BAECAE4A88978CCA1EB889C8A24FEF2AC530 | EB3414FD18E9D04ADA6A3CFF137D3D0BA0890DDC5D364EE59D9DB6A3CFF137D |
| 7 | 9C8FBABB44AA369DB1E43B7FE437FFC976CB9E71E262CFBA815F04F18F722A399 | 6B4BA0EF4917AF3194B999D5C7F646EFADD2D05CD33AD123BEFFF7200D23C65C6 |
| 8 | C82B686F2059DCDB3B2076B2AF2CA81901AED3A489C8A24FEF2AC53031966834 | 3449EDCA6759A10D5D03824DED5F3A7F41D8CF5304ADA6A3CFF137D3D0BA0890 |
| 9 | CAD53FDA7DCF5941D30B8D850C887A517FC98BFA369DB1E43B7FE437FFC976CB | 1E18BD9E5273F81E237FE34CE41F4F2D3061E1180EF4917AF3194B99D5C7F646 |
| 10 | D5E0757FC8B3FB44BA92D8927E021773C695660814141712 30EC22BAECAE4A889 | D09382B2F25FD808660D4FDA858F0B3AD264BBB96AA369DB1E43B7FE437FFC976 |
| .. | .. | .. |

FINGERPRINT AUTHENTICATION SERVER, CLIENT COMPUTER AND FINGERPRINT AUTHENTICATION METHOD

CROSS-REFERENCE TO RELATED APPLICATIONS

This is a U.S. continuation application filed under 35 USC 111(a) claiming benefit under 35 USC 120 and 365 (c) based on International Application No. PCT/JP2009/057267, filed on Apr. 9, 2009, the entire contents of which are hereby incorporated by reference.

FIELD

The disclosures herein generally relate to a fingerprint authentication server, a client computer and a fingerprint authentication method.

BACKGROUND

Recently increasing numbers of systems use fingerprint authentication for log-in operations of computers, etc. This results from a great cost reduction of fingerprint sensors and greatly improved processing capability of computers.

There are two types of systems which use the fingerprint authentication for log-in operations of computers. The one is stand-alone type and the other is client-server type.

In the stand-alone type system, the computers to be logged in to include fingerprint sensors, fingerprint authentication programs and registered fingerprint data. When a user logs in to the computer, a fingerprint image input via the fingerprint sensor is processed in the computer to be check fingerprint data (i.e., fingerprint data to be checked). The check fingerprint data is compared with the registered fingerprint data using the fingerprint authentication program. Then, if it is determined that the check fingerprint data corresponds to the registered fingerprint data, a log-in process is performed.

The stand-alone type system has a simple configuration and is mainly used for personal computers, mobile phones, etc.

The client-server type system includes two computers, one of which is to be logged in to (referred to as "a client computer") and another is an authentication server (see Patent Document 1, for example). In general, the client computer includes, as components for the fingerprint authentication, only a fingerprint sensor, a part of a fingerprint authentication program, and a fingerprint data generating program for generating check fingerprint data from the fingerprint image. The authentication server includes a fingerprint authentication program for determining match or mismatch of the fingerprint, user data of plural users, i.e., user IDs, and registered fingerprint data.

When a user logs in to the client computer, the fingerprint image is acquired from the fingerprint sensor and the check fingerprint data is generated using the fingerprint data generating program. The client computer transmits the user ID and the check fingerprint data of the user to the authentication server. The authentication server searches for the corresponding registered fingerprint data based on the received user ID and compares it with the received check fingerprint data using the fingerprint authentication program. The authentication server transmits a result to the client computer, and the client computer performs the log-in process if it receives the result representing correspondence of the data.

The client-server type is used for computers in companies, an arrival and departure managing system using the fingerprint authentication, etc. A configuration of the client-server type is complicated; however, the client-server type provides convenience such that users can log in to any client computers if the user data (user IDs and registered fingerprint data) of the users is registered in the authentication server. Further, in order to prevent the log-in process for a certain user because of retirement or the like, the user data of the user has only to be deleted from the authentication server. In this way, the client-server type has an advantage that central management can be easily implemented. In the companies, this central management function is indispensable. Thus, the overwhelming majority of the companies adopt this client-server type when they introduce the fingerprint authentication.

[Patent Document 1] Japanese Laid-open Patent Publication No. 2000-276445

In the client-server type system, the authentication server undertakes the total fingerprint authentication for the companies. In ordinary companies, starting and finishing times of work and a lunch break are fixed and company staffers go to work according to the starting time of work. In these days, the work in the companies largely depends on computer systems, and e-mail is often used for communications in the companies. For this reason, the company staffers tend to log in to the client computers first of all to check e-mail. Thus, the majority of the company staffers log in to the client computers immediately after the starting time of work, resulting in a heavy load on the authentication server. The causes of the load are as follows.

(1) Establishment of encrypted communication lines between the client computers and the authentication server. It is noted that in the client-server type of the fingerprint authentication, encrypting communications between the client computers and the authentication server is substantially indispensable.

(2) Search and retrieval of the user data using a database in the authentication server.

(3) Fingerprint authentication process in the authentication server.

However, even under heavy load conditions, it is necessary to transmit communications in the companies to the company staffers as soon as possible. Such a service in which the company staffers are recommended to shift the timing to log in to the client computers is not acceptable. Thus, the authentication server must have a capability sufficient to endure the heavy load. After the peak in the morning, authentication demands do not come frequently, and thus the authentication server is substantially in its idle state. Although it is not efficient in terms of a capital investment, the capability has to be increased according to the peak load, which leads to a problem that cost of hardware resources becomes high.

In this way, the fingerprint authentication of the client-server type has a problem about responsiveness of the authentication server.

SUMMARY

According to an aspect of the embodiment, a fingerprint authentication server device is provided. The fingerprint authentication server device includes a database in which user IDs and the registered fingerprint data of plural users are stored; and a hash value table including user hash values of the user IDs and the registered fingerprint data of the users. The fingerprint authentication server device is configured to receive a hash value of a user ID of a user to be authenticated and a hash value of registered fingerprint data associated with the user ID from a client computer; perform a search in the hash value table to determine whether there are hash values corresponding to the received hash values in the hash value table; and transmit a determination result to the client computer, thereby to cause the client computer to perform a fingerprint authentication process for a user for which correspondence of the hash values has been confirmed.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of data construction of a user data database.

FIG. 4 is a diagram illustrating an example of data construction of a hash value table.

FIG. 5 is a diagram illustrating an example of data construction of an index table.

FIG. 10 is a diagram illustrating an example of a data construction of a hash value table according to a second embodiment.

DESCRIPTION OF EMBODIMENTS

In the following, embodiments will be described with reference to the accompanying drawings.

First Embodiment

Figure 1:
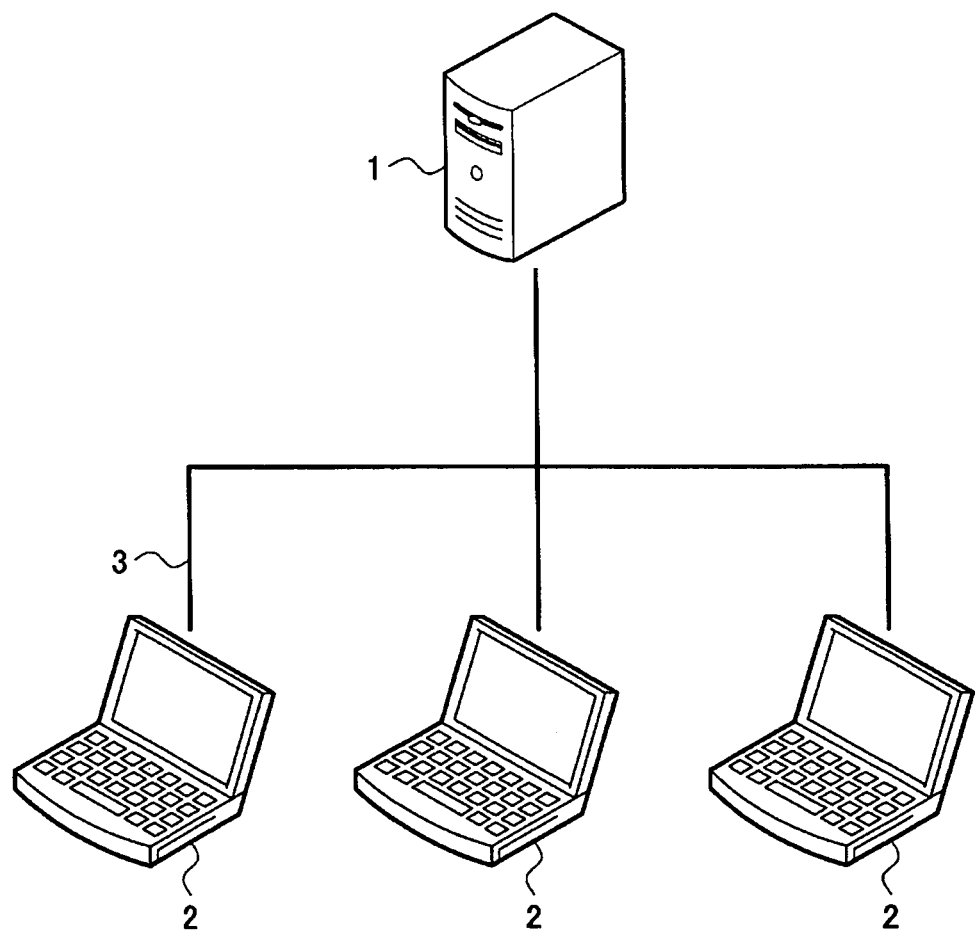
FIG. 1 is a drawing illustrating an example of a configuration of a system according to a first embodiment.

FIG. 1 is a drawing illustrating an example of the configuration of a system according to a first embodiment.

A fingerprint authentication server 1 is coupled to plural client computers 2 via a network 3 such as an Ethernet (registered trade mark).

Figure 2:
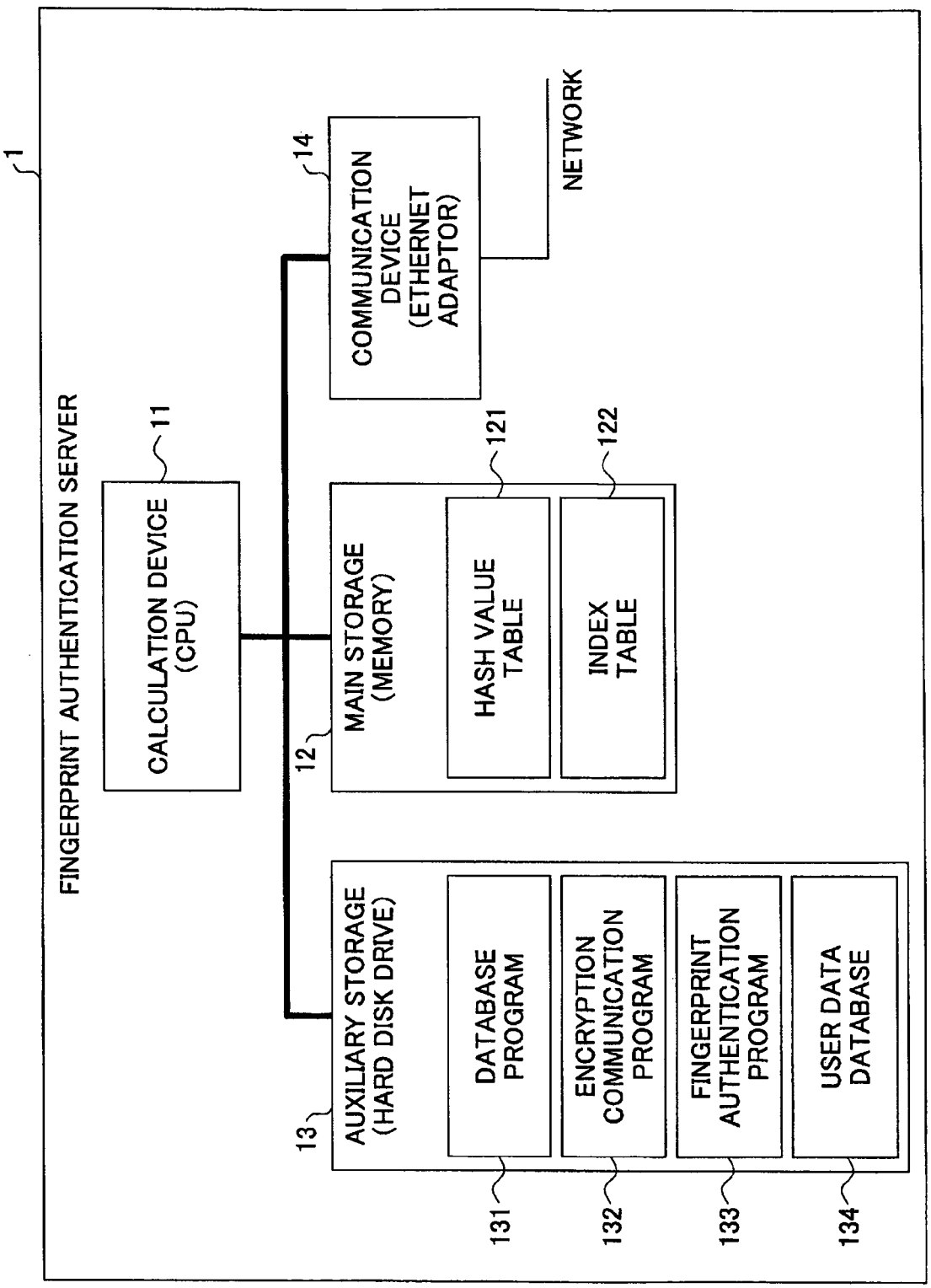
FIG. 2 is a drawing illustrating an example of a configuration of a fingerprint authentication server 1.

FIG. 2 is a drawing illustrating an example of the configuration of the fingerprint authentication server 1.

The fingerprint authentication server 1 includes a calculation device 11 such as CPU (Central Processing Unit), etc., a main storage 12 such as memory, etc., an auxiliary storage 13 such as a hard disk drive, etc., and a communication device 14 such as an Ethernet adaptor, etc.

The calculation device 11 has a main function of performing calculation, making copies of data, etc.

The main storage 12 has a relatively small capacity (1 GB though a few tens of GB, for example). The main storage 12 may be accessible at high speed from the calculation device 11. The main storage 12 stores a hash value table 121 and an index table 122 which are made in the fingerprint authentication server 1. These tables are used to determine at high speed whether hash values of a user ID and a registered fingerprint data transmitted from the client computer 2 for synchronization are included therein. The hash value table 121 and the index table 122 are described in detail hereinafter.

The auxiliary storage 13 has a great capacity (for example, a few hundreds of GB through a few TB), but has a low access speed. The auxiliary storage 13 stores a database program 131, an encryption communication program 132, a fingerprint authentication program 133 and a user data database 134. The database program 131, the encryption communication program 132 and the fingerprint authentication program 133 are copied in the main storage 12 to be executed (used).

The database program 131 has a function of manipulating the database. The encryption communication program 132 has a function of establishing an encryption communication line with another computer via a communication line. The fingerprint authentication program 133 has a function of determining whether fingerprint data to be checked (referred to as "check fingerprint data", hereinafter) and registered fingerprint data are originated from the same finger. The user data database 134 stores user data with respect to plural users to be authenticated in which user IDs of the respective users are associated with the registered fingerprint data of the corresponding users.

The communication device 14 has a function of connecting to an Internet, an Ethernet, or the like to perform communications.

FIG. 3 is a diagram illustrating an example of a data structure of the user data database 134 which includes items "user ID" and "registered fingerprint data". The "user ID" indicates an identifier for identifying the user. The "registered fingerprint data" indicates data describing features of a fingerprint image of the user obtained in advance.

FIG. 4 is a diagram illustrating an example of a data structure of the hash value table 121 which includes items "order", "user ID hash value" and "registered fingerprint data hash value". The "order" indicates order of a record in which the data is recorded in the hash value table 121. It is noted that a way of creating the hash value table 121 is described later; however, the records in the hash value table 121 are sorted according to the user ID hash values. The sorting is performed to make the search in the hash value table 121 easy.

The "user ID hash value" indicates a hash value corresponding to the user ID of the user data database 134. The hash value is obtained by performing a unidirectional (irreversible) process (i.e., a hash process) on data. The hash process is irreversible and unidirectional, and the data amount of the resultant data is less than that of the original data thereof. Therefore, it has an advantage that the original data is unlikely to be estimated. As a hash method (a hash function) for generating the hash value, MD5, SHA-1, SHA-2, SHA-224, SHA-256, SHA-384, SHA-512, etc., are known. Further, other processes using a residue system or unidirectional functions may be used. The illustrated example uses the SHA-2.

The "registered fingerprint data hash value" indicates a hash value calculated based on the registered fingerprint data of the user data database 134 using the hash function such as SHA-2, etc. The pair of the user ID hash value and the registered fingerprint data hash value is referred to as a user data hash value pair. The groups of the user data hash value pairs correspond to the hash value table 121.

If the SHA-2, which is a general hash function, is used, the user ID hash value requires 32 bytes and the registered fingerprint data hash value requires 32 bytes, and thus the total is 64 bytes. In the case of such a small capacity, the large-scale authentication server which even one million people use requires only 64 MB. Thus, there is no problem if all the data is stored in the memory under the current situation where DRAM memory is sold for a few thousand yen per 1 GB and an ordinary server commercially available includes memory of a few GB or a few tens of GB.

FIG. 5 is a diagram illustrating an example of a data structure of the index table 122 which includes items "leading numerical value" and "hash value number". The "leading numerical value" is incremented by 1 from "0". The "leading numerical value" is associated with a predetermined leading number of bytes of the user ID hash value. In the illustrated example, the user ID hash value is expressed by 32 bits (4 bytes), and the "leading numerical value" is associated with of the first two bytes. In this case, the "leading numerical value" is incremented by 1, such as "0000", "0001", "0002", and so on. The "hash value number" indicates the value of the order of the leading record of the user ID hash value, which has the same leading numerical value, on the hash value table 121. The index table 122 requires 262 KB if the "hash value number" requires 4 bytes. Therefore, there is no problem if all the data is stored in the memory.

Figure 6:
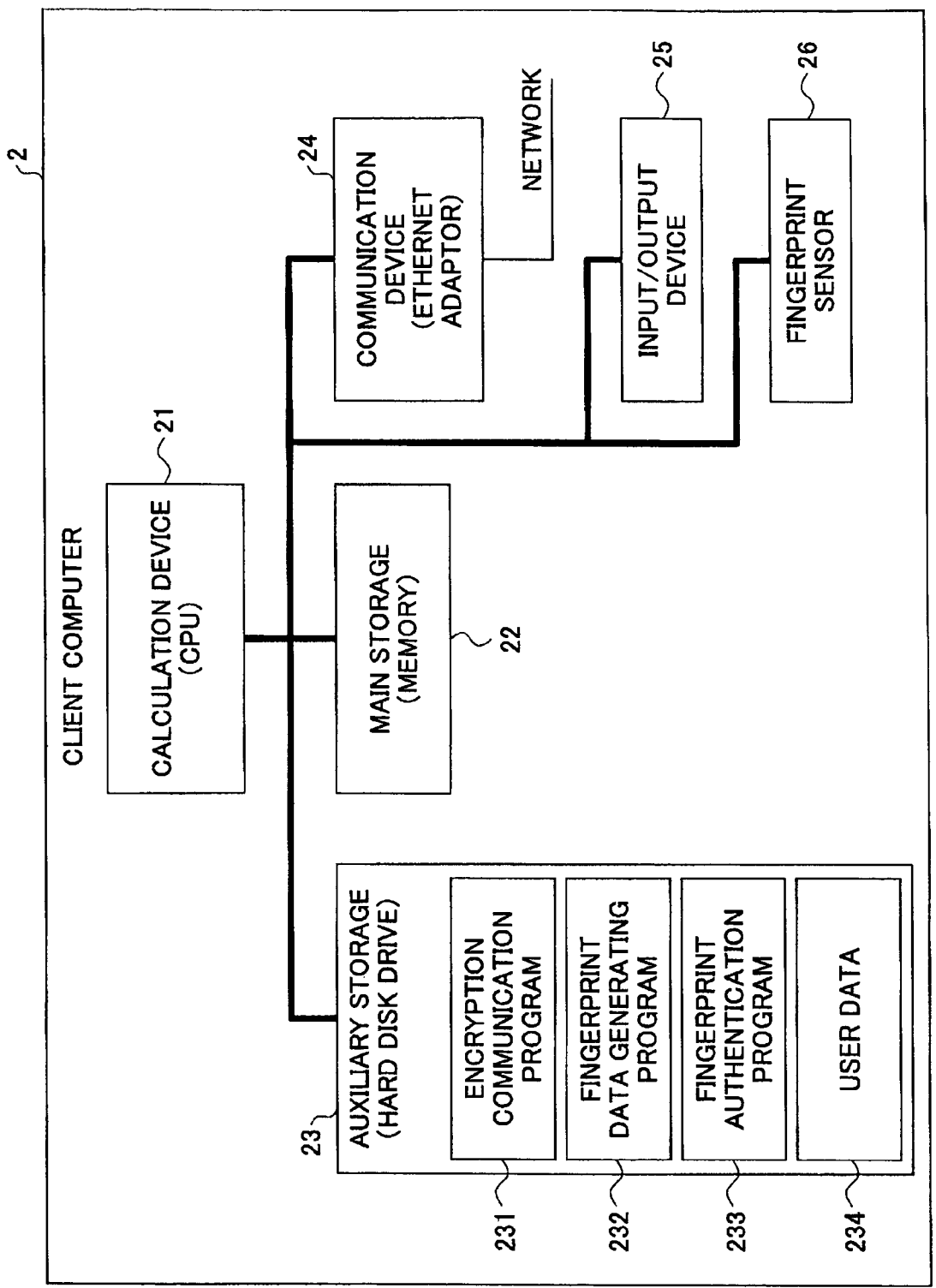
FIG. 6 is a drawing illustrating an example of the configuration of a client computer.

FIG. 6 is a drawing illustrating an example of the configuration of the client computer 2.

The client computer 2 includes a calculation device 21 such as CPU (Central Processing Unit), etc., a main storage 22 such as memory, etc., an auxiliary storage 23 such as a hard disk drive, etc., a communication device 24 such as an Ethernet adaptor, etc., an input/output device 25 such as a monitor, a keyboard, etc., and a fingerprint sensor 26.

The calculation device 21 has a main function of performing calculation, making copies of data, etc.

The main storage 22 has a relatively small capacity (1 GB though a few GB, for example). The main storage 12 may be accessible at high speed from the calculation device 21.

The auxiliary storage 23 has a great capacity (for example, a few tens of GB through a few hundreds of GB), but has a low access speed. The auxiliary storage 23 stores an encryption communication program 231, a fingerprint data generating program 232, a fingerprint authentication program 233 and user data 234. The encryption communication program 231, the fingerprint data generating program 232, the fingerprint authentication program 233 are copied in the main storage 12 to be executed (used).

The encryption communication program 231 has a function of establishing an encryption communication line with another computer via a communication line. The fingerprint data generating program 232 has a function of generating the check fingerprint data and the registered fingerprint data based on the fingerprint image. The fingerprint authentication program 233 has a function of determining whether the check fingerprint data and the registered fingerprint data are originated from the same finger.

The user data 234 stores user data of a user(s) who uses the client computer 2 frequently in which user ID of the user is associated with the registered fingerprint data of the user. The recording of the user data in the user data 234 is preferably performed when the client computer 2 is distributed to the user. The data structure of the user data 234 is substantially the same as that of the user data database 134 of the fingerprint authentication server 1 illustrated in FIG. 3.

The communication device 24 has a function of connecting to the Internet, an Ethernet, or the like to perform communications.

The input/output device 25 has a function of displaying images for the user and inputting text, etc., according to the user operations.

The fingerprint sensor 26 has a function of obtaining the image of the fingerprint of the finger of the user.

Next, operations according to the first embodiment are described.

Figure 7:
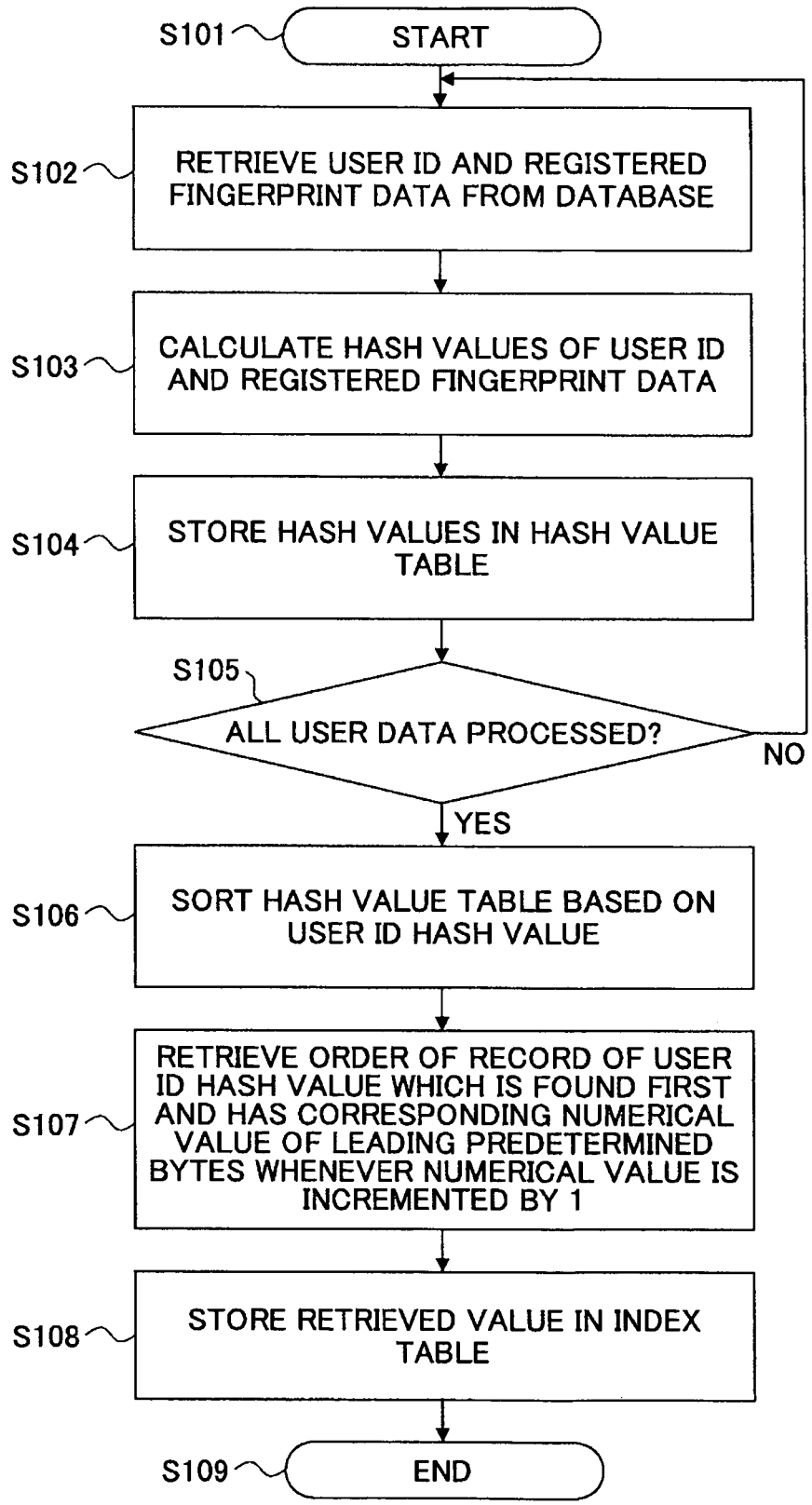
FIG. 7 is a flowchart illustrating an example of a process for generating the hash value table and the index table.

FIG. 7 is a flowchart illustrating an example of a process for generating the hash value table 121 and the index table 122 executed by the fingerprint authentication server 1. It is noted that the generation of the hash value table 121 and the index table 122 are performed after the user data database 134 is generated. This process is performed just before the system goes into service after the registration of the user data to the user data database 134 is completed. Further, the hash value table 121 and the index table 122 need to be generated again when the user data is added or deleted. Therefore, it is desirable that the registration and deletion of the user data is performed at the time which is shifted from the peak time, such as when the fingerprint authentication server 1 is not under heavy load conditions.

In FIG. 7, the calculation device 11 of the fingerprint authentication server 1 starts the process (step s101), and retrieves one item of the user data which includes a pair of the user ID and the registered fingerprint data from the user data database 134 using the database program 131 (step s102).

Next, the calculation device 11 calculates the hash value of the retrieved user ID and the hash value of the retrieved registered fingerprint data, respectively, using the hash function such as SHA-2, etc (step s103).

Next, the calculation device 11 stores the calculated hash value of the user ID as a user ID hash value and the calculated hash value of the registered fingerprint data as a registered fingerprint data hash value in the hash value table 121 (step s104).

Next, the calculation device 11 determines whether all the user data has been processed (step s105), and if all the user data has not been processed yet (No in step s105), it returns to the retrieving process of the user data (step s102).

If all the user data has been processed (Yes in step s105), the calculation device 11 sorts the data in the hash value table 121 in ascending order based on the user ID hash values (step s106).

Next, the calculation device 11 performs a search in the hash value table 121 from the beginning to retrieve and record the order of the records of the user ID hash value which is found first whenever the leading numerical value, which corresponds to a predetermined number of bytes (two bytes, for example) of the user ID hash value in the hash value table 121, is incremented by 1 (step s107). In the case of the predetermined number of bytes being two byte, the process is performed on the leading numerical values from "0000" to "FFFF".

Next, the calculation device 11 stores the retrieved values of the order of records in the index table 122 such that they are associated with the corresponding leading numerical values (step s108), and terminates the process (step s109).

It is noted that the hash value table 121 is sorted in ascending order (step s106) and the order of the first record of the user ID hash value whose first predetermined number of bytes corresponds to the numerical value which is incremented by 1 is retrieved (step s107); however, the hash value table 121 may be sorted in descending order and the order of the first record of the user ID hash value whose first predetermined number of bytes corresponds to the numerical value which is decremented by 1 from the maximum value may be retrieved. This depends on whether the search in the index table 122 is performed in ascending order of the user hash value or descending order of the user hash value after the system goes into service.

With the hash value table 121 and the index table 122, it is possible to locate a particular user data hash value pair by comparisons of the two bytes for 65536 times and then comparisons of the 32 bytes for 16 times even in the case of the large-scale service for one million users, for example. Since the hash value table 121 and the index table 122 are stored in the memory, the search process can be performed at significantly higher speed in comparison with the user data search process which uses the database. In is noted that when the addition, deletion, update of users, etc., are performed after the service is started, it is necessary to reconstruct the hash value table 121 and the index table 122. In this connection, since the fingerprint authentication server 1 is substantially in an idle state except for a short period at the peak time, the addition, deletion, update of users, etc., may be performed in such an idle state.

Next, a fingerprint authentication process between the client computer 2 and the fingerprint authentication server 1 after the system goes into service is described with reference to FIGS. 1, 2, 6, etc. It is noted that the individual processes of the client computer 2 and the fingerprint authentication server 1 are described later, and at first, the processes across both are described. Further, as an example, the fingerprint authentication is applied to a log-in operation in the client computer 2; however, the result of the fingerprint authentication may be used for any purpose. For example, the fingerprint authentication may be used for management of arrival and departure, by using the client computers 2 as computers provided at an entrance and an exit of a facility.

First of all, a user inputs a user ID to the client computer 2 via the input/output device 25 and inputs an authentication image to the client computer 2 by placing his/her finger on the fingerprint sensor 26. The client computer 2 compares the input user ID with the user ID of the user data 234 stored in the auxiliary storage 23. Normally, these correspond to each other. In some cases such as where a separate user tries to log in to the client computer 2 for purposes of maintenance, etc., these do not correspond. These cases are described later. At first, the case in which these user IDs correspond to each other is described.

If these user IDs correspond to each other, the user ID hash value and the registered fingerprint data hash value of the user data 234 in the auxiliary storage 23 are calculated. Recently, it is ordinary that a computer, which may be used as a client computer 2, has a processing capability equivalent to an ordinary server. Thus, this process is completed nearly instantaneously. After the calculation of the hash values, the client computer 2 establishes the encryption communication line to the fingerprint authentication server 1. The client computer 2 transmits the user ID hash value and the registered fingerprint data hash value via the communication device 24.

In the fingerprint authentication server 1, the search in the index table 122 and the hash value table 121 is performed using the user ID hash value transmitted from the client computer 2. After the search is completed, the comparison process of the registered fingerprint data hash value is performed. A result of this process includes the following items (1) through (3).

(1) The corresponding user ID hash value is found and the registered fingerprint data hash values correspond to each other (i.e., a normal situation).

(2) The corresponding user ID hash value is found but the registered fingerprint data hash values do not correspond to each other.

(3) The corresponding user ID hash value is not found.

The fingerprint authentication server 1 transmits the processing result to the client computer 2.

The client computer 2 branches to the processes according to the processing result. In the following, the process in response to the processing result (1) is described, and the remaining processes are described later.

In a normal situation, the processing result (1) is transmitted. In this case, the client computer 2 generates the check fingerprint data from the fingerprint image, and checks the generated check fingerprint data against the registered fingerprint data of the user data 234 in the auxiliary storage 23. If the check result is a match, the client computer 2 closes the encryption communication line and starts the log-in process. If the generated fingerprint data does not correspond to the registered fingerprint data, the client computer 2 returns to the acquiring process of the user ID and the fingerprint image.

Next, a case where the input user ID does not correspond to the user ID of the user data 234 in the auxiliary storage 23 is described. In this case, at first, the check fingerprint data is generated from the fingerprint image. Next, the client computer 2 establishes the encryption communication line to the fingerprint authentication server 1 to transmit the user ID and the check fingerprint data.

In the fingerprint authentication server 1, the search process in the user data database 134 and the checking process are performed based on the transmitted user ID and the check fingerprint data. If there is correspondence, the result representing the match as well as the registered fingerprint data are transmitted to the client computer 2. If there is not correspondence, only the result representing the mismatch is transmitted to the client computer 2.

In response to the result representing the match, the client computer 2 additionally stores the user ID and the transmitted registered fingerprint data in the user data 234 in the auxiliary storage 23. Now, from the next time, this user can perform the checking process at the client computer 2. The client computer 2 closes the encryption communication line and starts the log-in process. If the result represents the mismatch, the client computer 2 returns to the acquiring process of the user ID and the fingerprint image.

Next, a process in the case where the processing result (2) is transmitted from the fingerprint authentication server 1 after the client computer 2 transmits the hash values is described. In response to this processing result, at first, the client computer 2 generates the check fingerprint data from the input fingerprint image. Next, the client computer 2 transmits the user ID and the check fingerprint data to the fingerprint authentication server 1.

In the fingerprint authentication server 1, the search process in the user data database 134 and the checking process are performed based on the transmitted user ID and the check fingerprint data. If there is correspondence, the result representing the match as well as the registered fingerprint data are transmitted to the client computer 2. If there is not correspondence, only the result representing the mismatch is transmitted to the client computer 2.

In response to the result representing the match, the client computer 2 overwrites the current registered fingerprint data in the user data 234 with the transmitted registered fingerprint data. Now, from the next time, this user can perform the checking process at the client computer 2 as usual. The client computer 2 closes the encryption communication line and starts the log-in process. If the result represents the mismatch, the client computer 2 returns to the acquiring process of the user ID and the fingerprint image.

Next, a process in the case where the processing result (3) is transmitted from the fingerprint authentication server 1 after the client computer 3 transmits the hash values is described. In this case, since there is no qualification to log in to the client computer 2, the client computer 2 regards it as a failure in checking process and returns to the acquiring process of the user ID and the fingerprint image.

Next, the individual processes of the client computer 2 and the fingerprint authentication server 1 are described using flowcharts.

FIGS. 8A through 8F are flowcharts illustrating examples of processes at the time of the fingerprint authentication in the client computer 2.

Figure 8A:
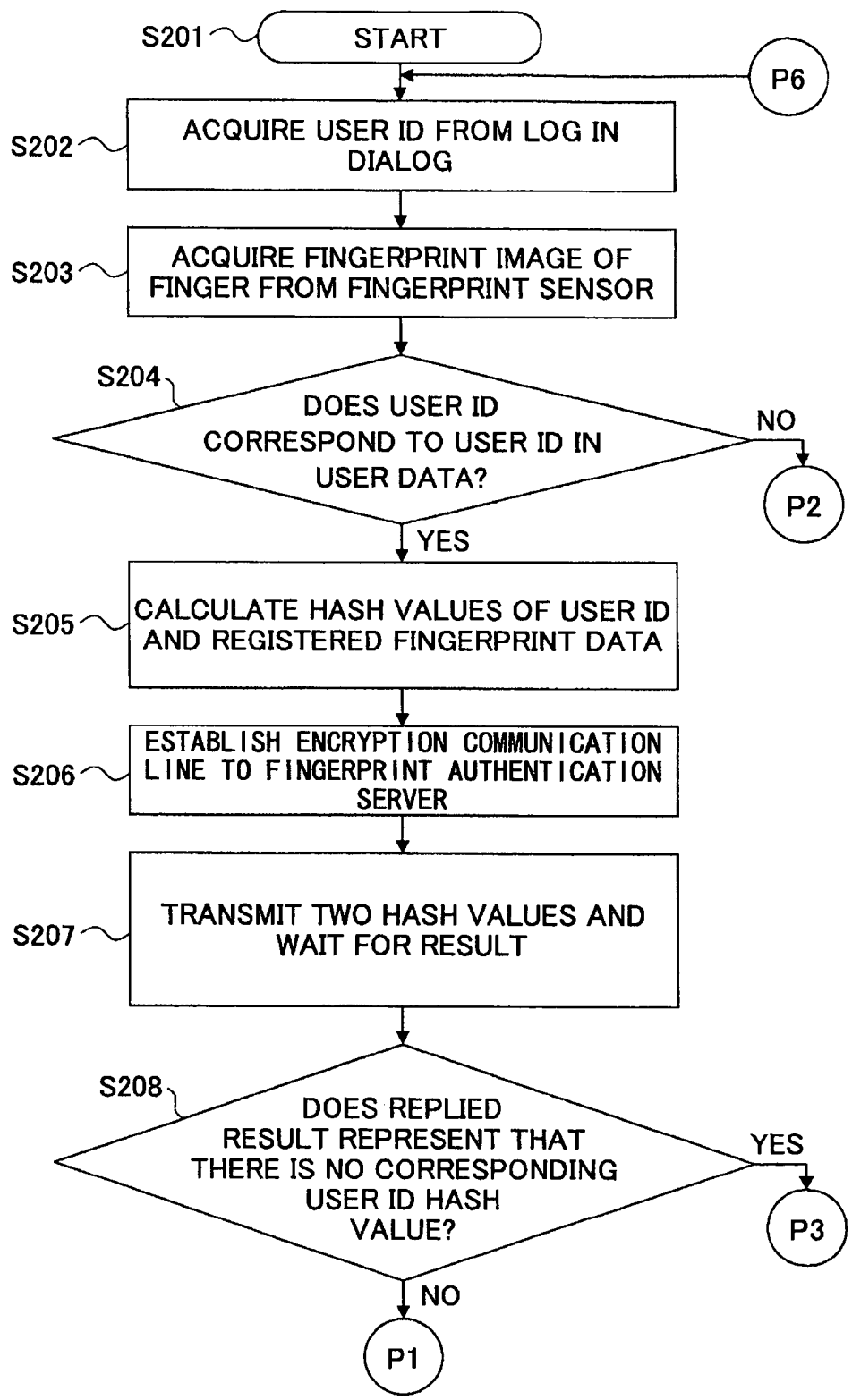
FIG. 8A is a flowchart (part 1) illustrating an example of processes at the time of fingerprint authentication in the client computer 2.

In FIG. 8A, the calculation device 21 of the client computer 2 starts the process (step s201), and acquires the user ID when the user ID is input in a user ID field of a log-in dialog displayed on the monitor screen of the input/output device 25 (step s202).

Next, the calculation device 21 monitors the fingerprint sensor 26. When the calculation device 21 senses the finger of the user being put on the fingerprint sensor 26, it acquires an image of the fingerprint of the finger at that time (step s203).

Next, the calculation device 21 checks the user ID acquired from the user ID field of the log-in dialog against the user ID of the user data 234 stored in the auxiliary storage 23 (step s204). If the user data 234 includes data of plural users, the user ID acquired from the user ID field is checked against all the user data.

If there is a corresponding user ID in the user data 234 (Yes in step s204), the calculation device 21 calculates the hash value of the user ID (i.e., the user ID hash value) and the hash value of the registered fingerprint data (i.e., the registered fingerprint data hash value) which is paired with the user ID (step s205).

Next, the calculation device 21 establishes the encryption communication line with the fingerprint authentication server 1 using the encryption communication program 231 (step s206).

Next, the calculation device 21 causes the communication device 14 to transmit the calculated two hash values to the fingerprint authentication server 1 and waits for the reception of the processing result (step s207).

Here, the process after the reception of the processing result is described. It is noted that the processes of the fingerprint authentication server 1 is described later.

The calculation device 21 determines whether the processing result from the fingerprint authentication server 1 represents that there is no corresponding user ID hash value (step s208). If the processing result does not represent that there is no corresponding user ID hash value (No in step s208, P1), the process routine goes to a process in FIG. 8B.

Figure 8B:
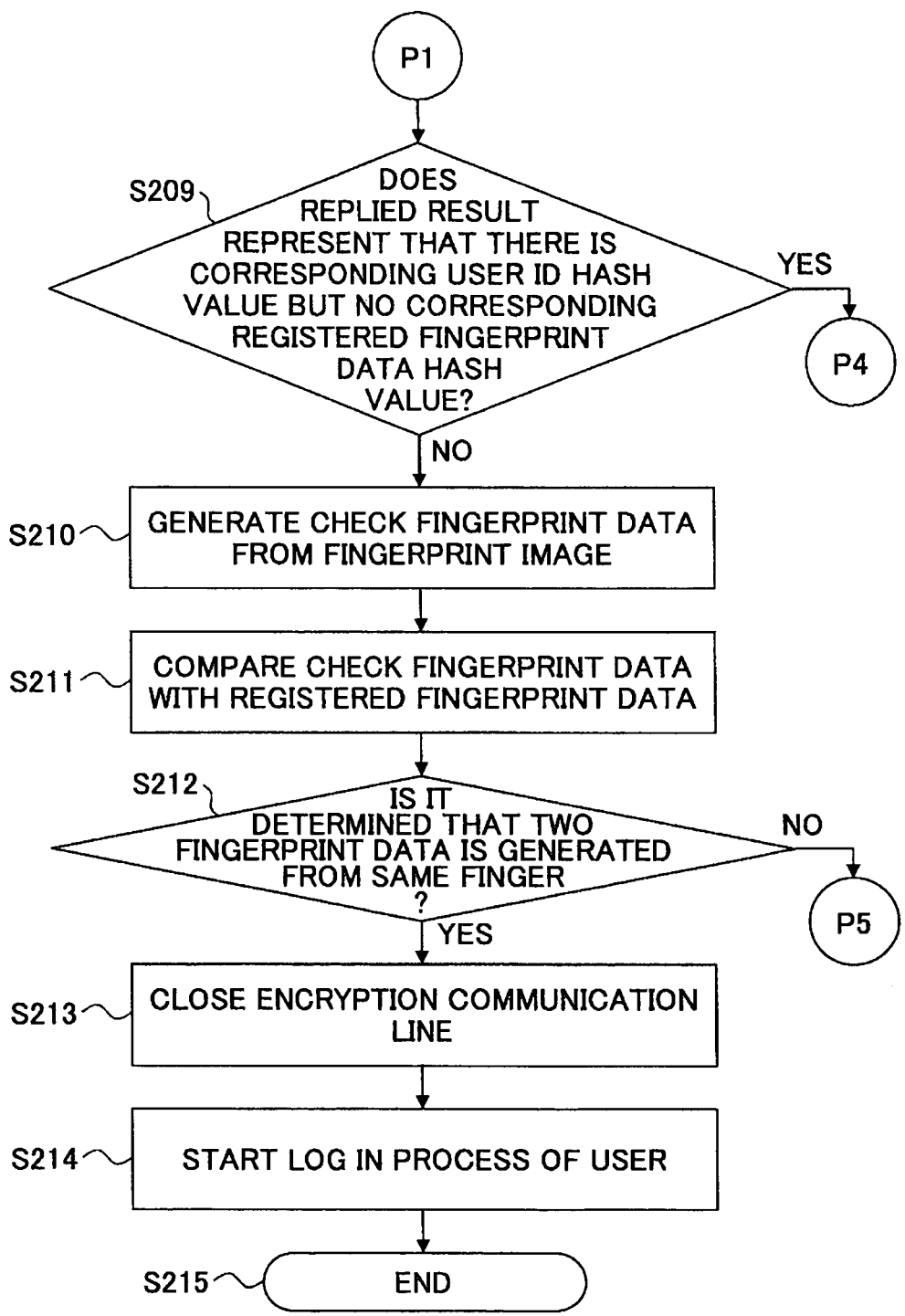
FIG. 8B is a flowchart (part 2) illustrating an example of processes at the time of fingerprint authentication in the client computer 2.

In FIG. 8B, the calculation device 21 further determines the processing result from the fingerprint authentication server 1 (step s209).

If the processing result represents that there is the corresponding user ID hash value but the registered fingerprint data hash values do not correspond to each other (No in step s209), the calculation device 21 generates the check fingerprint data from the fingerprint data acquired already using the fingerprint data generating program 232 (step s210).

Next, the calculation device 21 checks the generated check fingerprint data against the registered fingerprint data already reserved to determine whether these two items of the data are originated from the same finger using the fingerprint authentication program 233 (step s211, s212).

If it is determined that these two items of the data originate from the same finger (Yes in step s212), the calculation device 21 closes the encryption communication line with the fingerprint authentication server 1 using the encryption communication program 231 (step s213). Then, the calculation device 21 starts the log-in process of the successively checked user (step s214) and terminates the process (step s215).

Figure 8C:
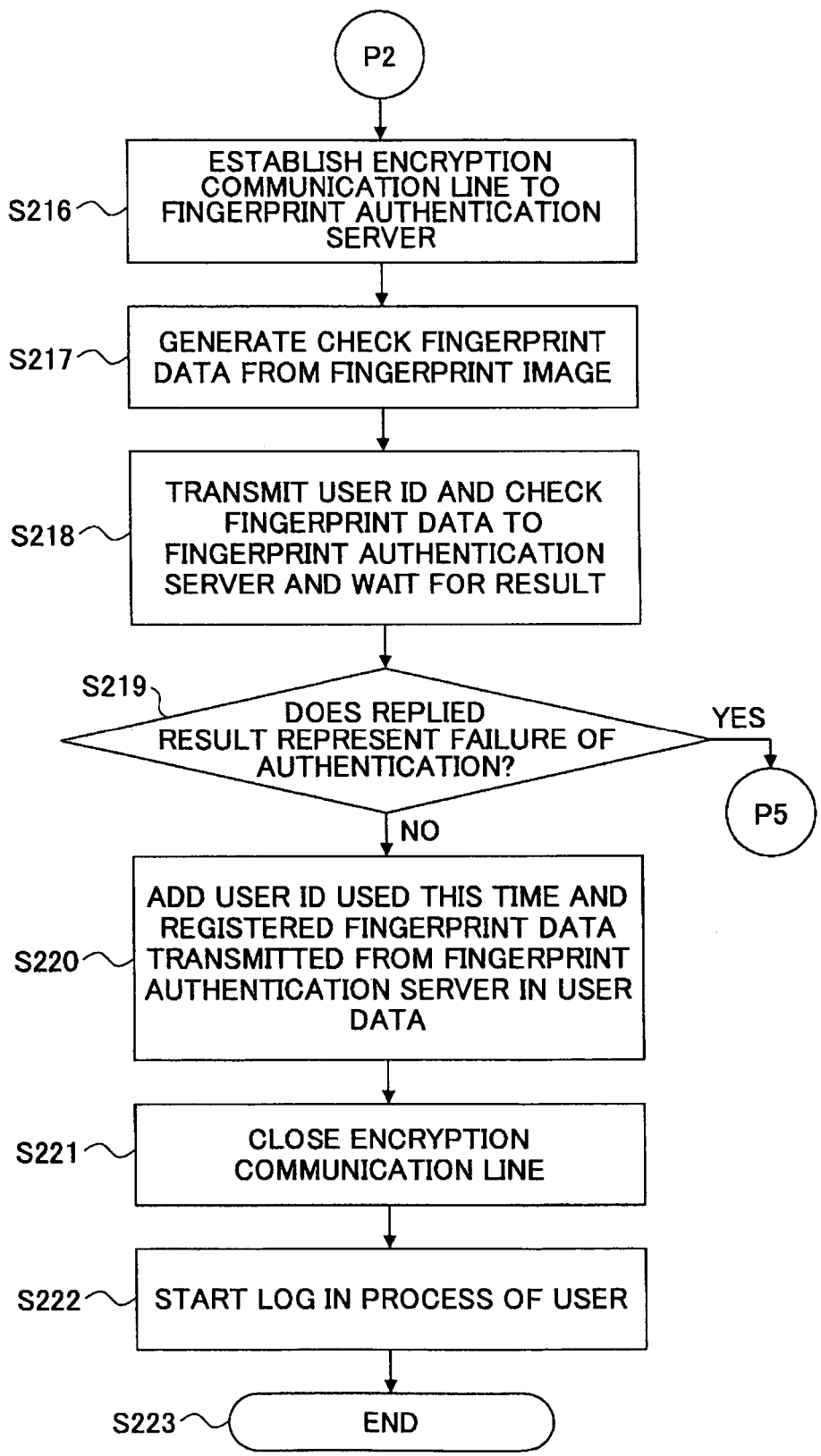
FIG. 8C is a flowchart (part 3) illustrating an example of processes at the time of fingerprint authentication in the client computer 2.

On the other hand, if there is no corresponding user ID in the user data 234 (No in step s204, P2 in FIG. 8A), that is to say, if the corresponding user ID is not stored in the user data 234 of the client computer 2, the process routine goes to a process in FIG. 8C.

In FIG. 8C, the calculation device 21 establishes the encryption communication line with the fingerprint authentication server 1 using the encryption communication program 231 (step s216).

Next, the calculation device 21 generates the check fingerprint data from the fingerprint data acquired already using the fingerprint data generating program 232 (step s217).

Next, the calculation device 21 causes the communication device 14 to transmit the user ID acquired already and the generated check fingerprint data to the fingerprint authentication server 1 and waits for the reception of the processing result (step s218).

Here, the process after the reception of the processing result is described. It is noted that the processes of the fingerprint authentication server 1 are described later.

The calculation device 21 determines whether the processing result from the fingerprint authentication server 1 represents the failure of the authentication (step s219). If the processing result does not represent the failure of the authentication (No in step s219), the calculation device 21 adds the registered fingerprint data, which is transmitted from the fingerprint authentication server 1 together with the processing result representing the success of the authentication, in the user data 234 such that the registered fingerprint data is paired with the user ID which succeeds in the authentication this time (step s220).

Then, the calculation device 21 closes the encryption communication line with the fingerprint authentication server 1 using the encryption communication program 231 (step s221), starts the log-in process of the successively checked user (step s222) and terminates the process (step s223).

Figure 8D:
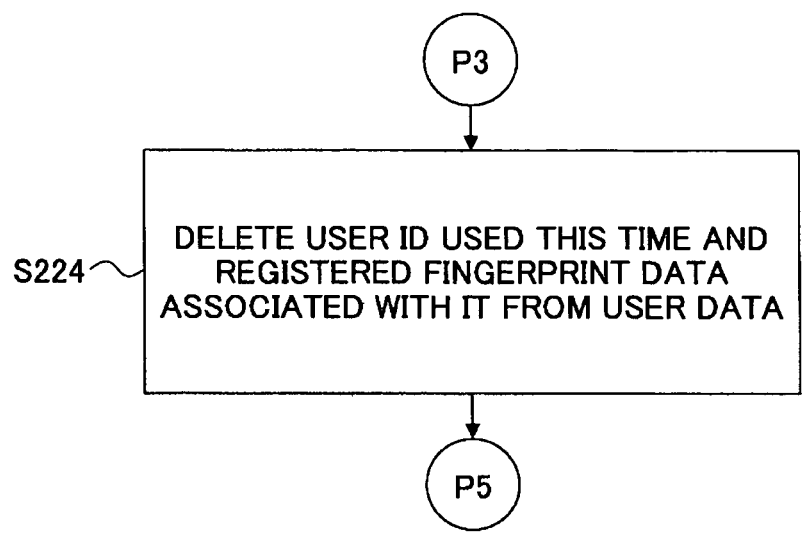
FIG. 8D is a flowchart (part 4) illustrating an example of processes at the time of fingerprint authentication in the client computer 2.

On the other hand, if the processing result from the fingerprint authentication server 1 represents that there is no corresponding user ID hash value (Yes in step s208, P3 in FIG. 8A), the process routine goes to a process in FIG. 8D.

In FIG. 8D, the calculation device 21 deletes the user ID used this time and the registered fingerprint data paired with the user ID from the user data 234 (step s224). The fact that there is no corresponding user ID hash value in the fingerprint authentication server 1 means that it is deleted from the fingerprint authentication server 1.

Figure 8E:
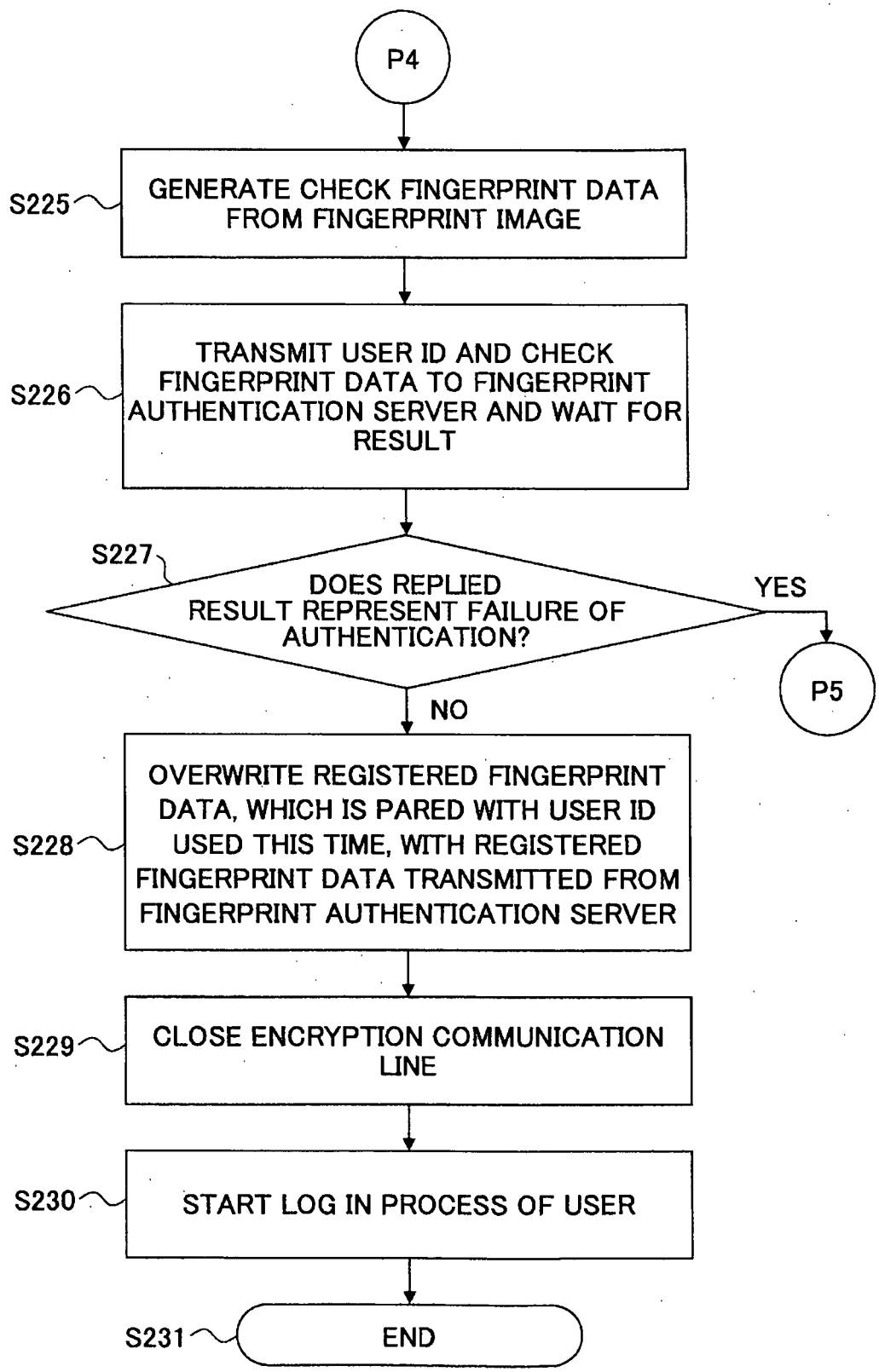
FIG. 8E is a flowchart (part 5) illustrating an example of processes at the time of fingerprint authentication in the client computer 2.
Figure 8F:
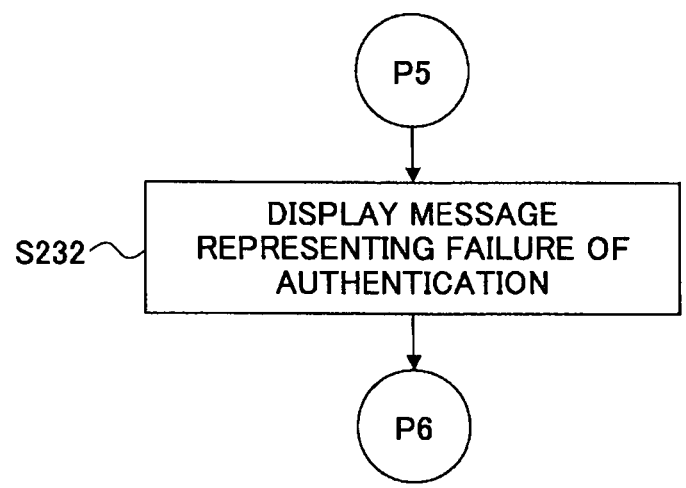
FIG. 8F is a flowchart (part 6) illustrating an example of processes at the time of fingerprint authentication in the client computer 2.

Then, the process routine goes to a process in FIG. 8F in which the calculation device 21 displays a message "no mach of fingerprint" or the like for a predetermined time (1 through 2 seconds, for example) (step s232), and returns to the acquiring process of the user ID (step s202, P6 in FIG. 8A).

On the other hand, if the processing result represents that the corresponding user ID hash value is found but the registered fingerprint data hash values do not correspond to each other (Yes in step s209, P4 in FIG. 8B), the process routines goes to a process in FIG. 8E. In this case, it may be determined that the registered fingerprint data in the fingerprint authentication server 1 is updated.

In FIG. 8E, the calculation device 21 generates the check fingerprint data from the fingerprint data acquired already using the fingerprint data generating program 232 (step s225).

Next, the calculation device 21 transmits the user ID and the check fingerprint data to the fingerprint authentication server 1 via the encryption communication line already established and waits for the reception of the processing result (step s226).

Here, the process after the reception of the processing result is described. It is noted that the processes of the fingerprint authentication server 1 is described later.

The calculation device 21 determines whether the processing result from the fingerprint authentication server 1 represents the failure of the authentication (step s227). If the processing result does not represent the failure of the authentication (No in step s227), the calculation device 21 overwrites the old registered fingerprint data currently existing in the user data 234 with the registered fingerprint data which is transmitted from the fingerprint authentication server 1 together with the processing result representing the success of the authentication (step s228).

Then, the calculation device 21 closes the encryption communication line with the fingerprint authentication server 1 using the encryption communication program 231 (step s229), starts the log-in process of the successively checked user (step s230) and terminates the process (step s231).

On the other hand, if the processing result represents the failure of the authentication (Yes in step s219, P5 in FIG. 8C) (Yes in step s227, P5 in FIG. 8E), the process routine goes to a process in FIG. 8F, as described above. Then, the calculation device 21 displays a message "no mach of fingerprint" or the like for a predetermined time (1 through 2 seconds, for example) (step s232), and returns to the acquiring process of the user ID (step s202, P6 in FIG. 8A).

FIGS. 9A through 9F are flowcharts illustrating examples of processes at the time of the fingerprint authentication in the fingerprint authentication server 1.

Figure 9A:
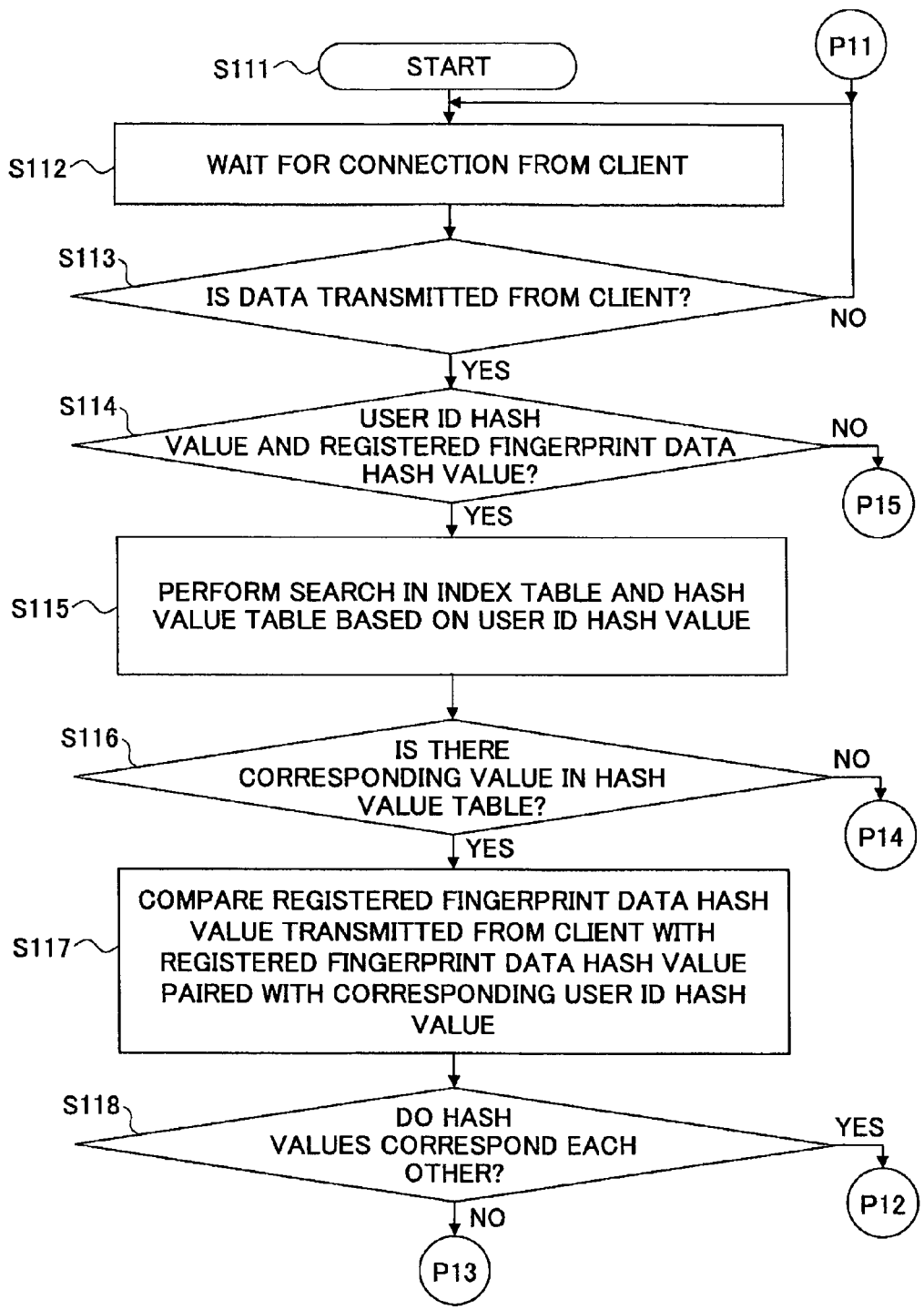
FIG. 9A is a flowchart (part 1) illustrating an example of processes at the time of fingerprint authentication in the fingerprint authentication server 1.

In FIG. 9A, the calculation device 11 of the fingerprint authentication server 1 starts the process (step s111), and waits for the connection process from the client computer 2 at a predetermined port. (steps s112, s113).

If there is a connection request from the client computer 2 (Yes in step 113), the calculation device 11 determines whether the data from the client computer 2 is the user ID hash value and the registered fingerprint data hash value (step s114). The data from the client computer 2 is the pair of the user ID hash value and the registered fingerprint data hash value or the pair of the user ID and the check fingerprint data.

If the data from the client computer 2 is the user ID hash value and the registered fingerprint data hash value (Yes in step s114), the calculation device 11 performs the search in the index table 122 and the hash value table 121 based on the user ID hash value (step s115).

Next, the calculation device 11 determines whether there is the corresponding user ID hash value in the hash value table 121 (step s116). If there is the corresponding user ID hash value in the hash value table 121 (Yes in step 116), the calculation device 11 checks the received registered fingerprint data hash value against the registered fingerprint data hash value paired with the corresponding user ID hash value (steps s117, s118).

Figure 9B:
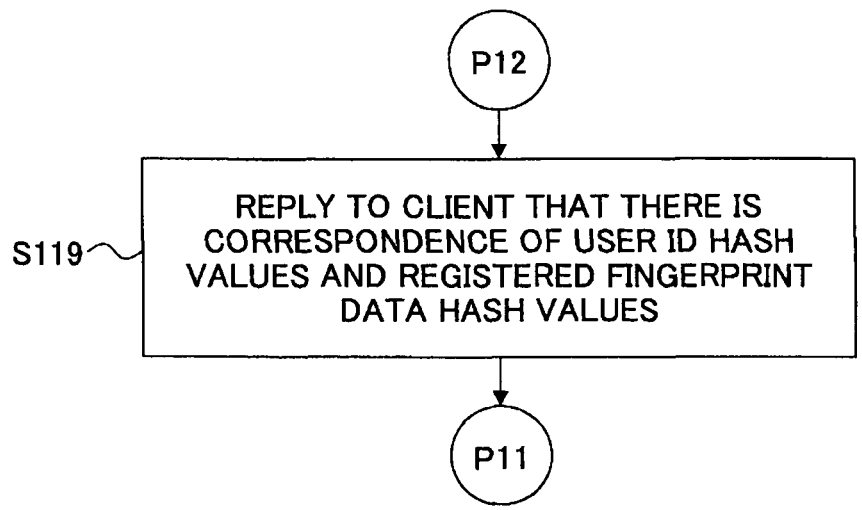
FIG. 9B is a flowchart (part 2) illustrating an example of processes at the time of fingerprint authentication in the fingerprint authentication server 1.

Next, if the registered fingerprint data hash values correspond to each other (Yes in step s118, P12), the process routine goes to a process in FIG. 9B.

In FIG. 9B, the calculation device 11 replies to the client computer 2 that there are the corresponding user ID hash value and the corresponding registered fingerprint data hash value (step s119), and returns to the waiting status for the connection from the client computer 2 (step s112, P11 in FIG. 9A).

Figure 9C:
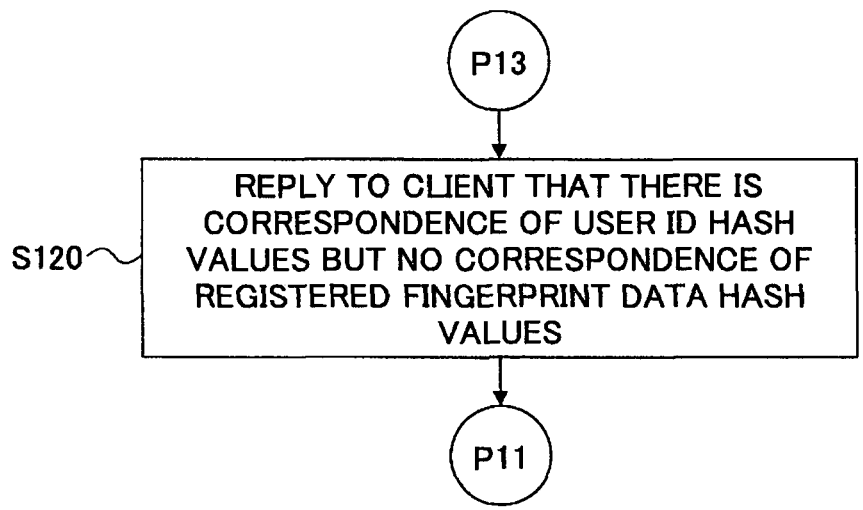
FIG. 9C is a flowchart (part 3) illustrating an example of processes at the time of fingerprint authentication in the fingerprint authentication server 1.

On the other hand, if the received registered fingerprint data hash value does not correspond to the registered fingerprint data hash value retrieved from the hash value table 121 (step s118, P13 in FIG. 9A), the process routine goes to a process in FIG. 9C.

In FIG. 9C, the calculation device 11 replies to the client computer 2 that there is the corresponding user ID hash value but no corresponding registered fingerprint data hash value (step s120), and returns to the waiting status for the connection from the client computer 2 (step s112, P11 in FIG. 9A).

Figure 9D:
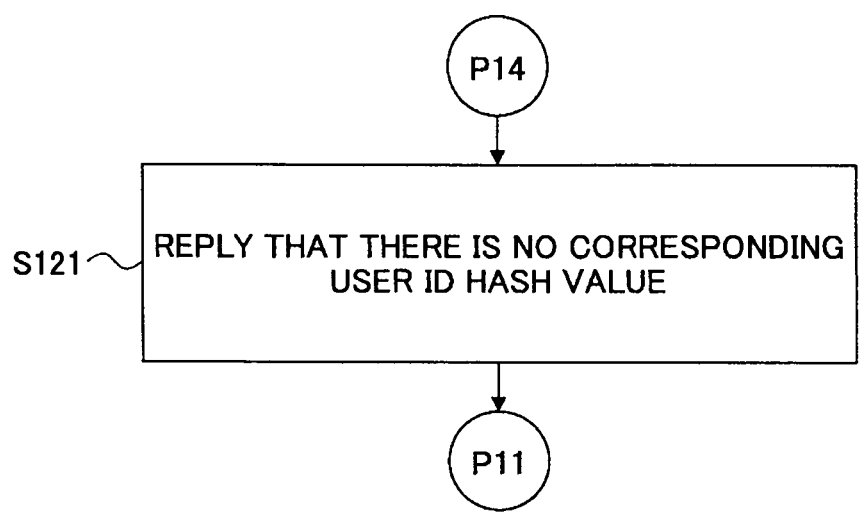
FIG. 9D is a flowchart (part 4) illustrating an example of processes at the time of fingerprint authentication in the fingerprint authentication server 1.

On the other hand, if there is no corresponding value in the hash value table 121 (No in step s116, P14 in FIG. 9A), the process routine goes to a process in FIG. 9D.

In FIG. 9D, the calculation device 11 replies to the client computer 2 that there is no corresponding user ID hash value (step s121), and returns to the waiting status for the connection from the client computer 2 (step s112, P11 in FIG. 9A).

Figure 9E:
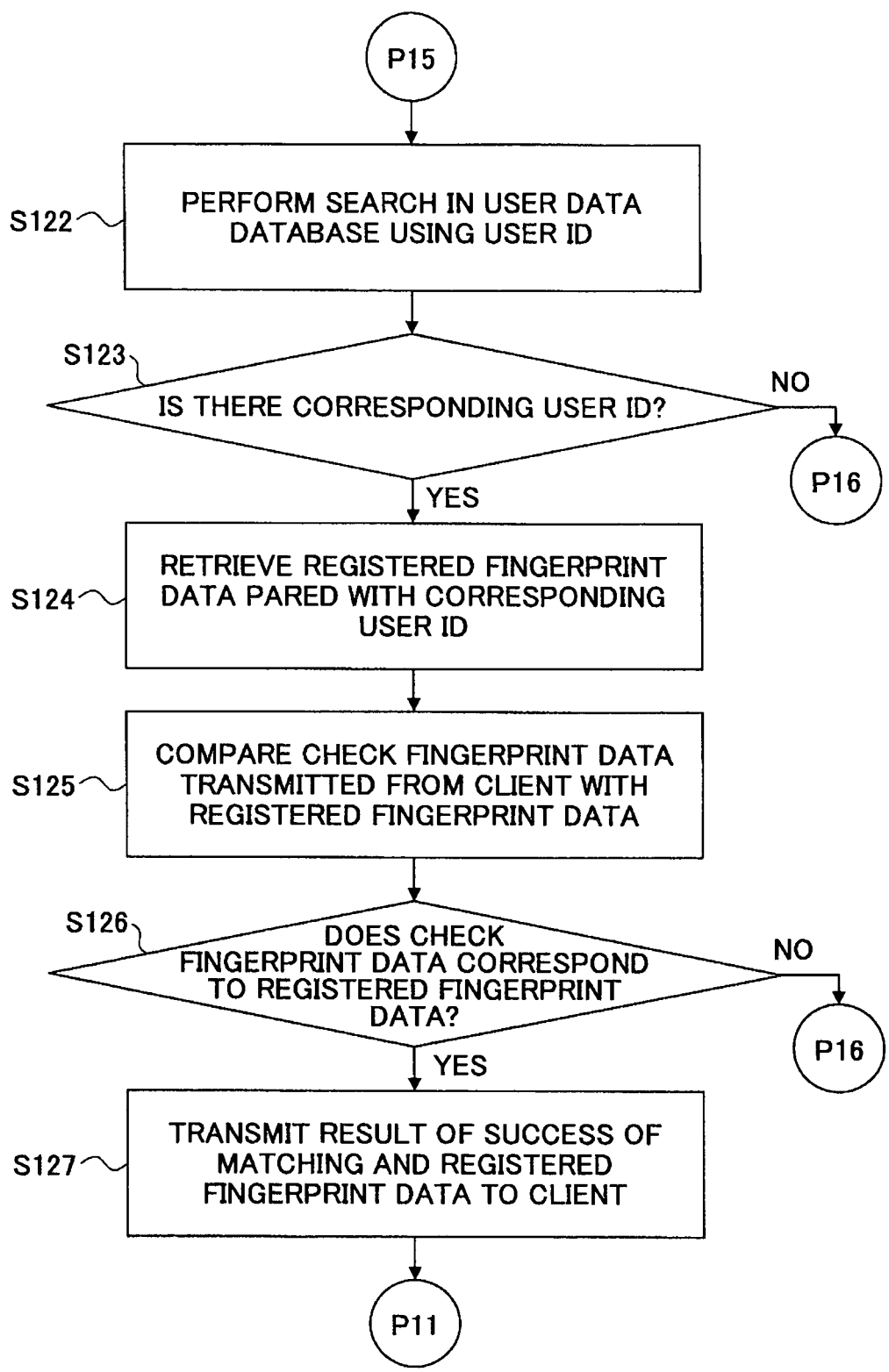
FIG. 9E is a flowchart (part 5) illustrating an example of processes at the time of fingerprint authentication in the fingerprint authentication server 1.

On the other hand, if the data from the client computer 2 is not the user ID hash value and the registered fingerprint data hash value (No in step s114, P15), that is to say, if the data is the user ID and the check fingerprint data, the process routine goes to a process in FIG. 9E.

In FIG. 9E, the calculation device 11 performs the search in the user data database 134 based on the user ID transmitted from the client computer 2 using the database program 131 (steps s122, s123). If there is the corresponding user ID in the user data database 134 (Yes in step s123), the calculation device 11 retrieves the registered fingerprint data paired with the corresponding user ID (step s124).

Next, the calculation device 11 determines, based on the registered fingerprint data already retrieved and the check fingerprint data transmitted from the client computer 2, whether these two items of the data are generated from the same finger using the fingerprint authentication program 133 (steps s125, s126).

If it is determined that these two items of the data are generated from the same finger (Yes in step s126), the processing result representing the success of the correspondence and the registered fingerprint data already retrieved are transmitted to the client computer 2 (step s127). After that, the calculation device 11 returns to the waiting status for the connection from the client computer 2 (step s112, P11 in FIG. 9A).

Figure 9F:
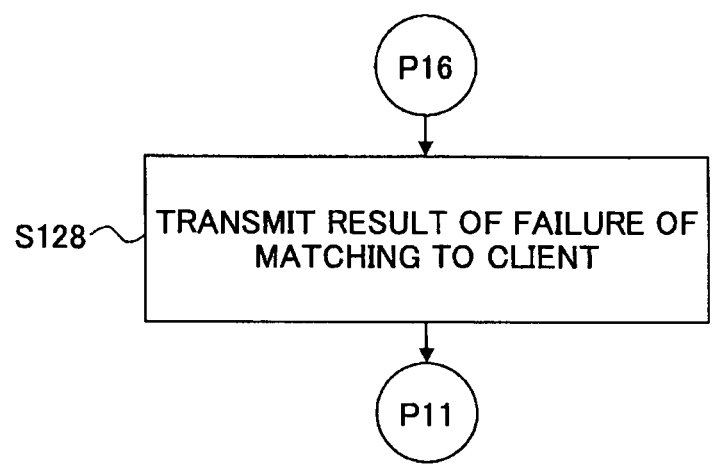
FIG. 9F is a flowchart (part 6) illustrating an example of processes at the time of fingerprint authentication in the fingerprint authentication server 1.

On the other hand, if there is no corresponding user ID in the user data database 134 (No in step s123, P16 in FIG. 9E), or if it is not determined that the items of the data is generated from the same finger (No in step s126, P16 in FIG. 9E), the process routine goes to a process in FIG. 9F.

In FIG. 9F, the calculation device 11 transmits the processing result representing the failure of the correspondence to the client computer 2 (step s128), and returns to the waiting status for the connection from the client computer 2 (step s112, P11 in FIG. 9A).

Second Embodiment

In the first embodiment described above, the registered fingerprint data stored in the user data database 134 of the fingerprint authentication server 1 or in the user data 234 of the client computer 2 may be of any type. Thus, in terms of a principle, the registered fingerprint data of a minutiae type or a pattern type may be used. Further, a combination thereof may be used.

The minutiae type utilizes location of feature points (branch points, end points, delta, etc.) and a direction of a ridge as fingerprint features. The pattern type utilizes a geometric pattern appearing in a fingerprint image as fingerprint features. Thus, the minutiae type enables a high-speed checking process, and has an advantage in terms of preservation of privacy because it is substantially impossible to reproduce the original fingerprint image from the registered fingerprint data. However, the minutiae type severely selects the finger (i.e., a featureless fingerprint is difficult to be checked) and has a disadvantage that it is sensitive to roughening of the finger. Further, the pattern type requires the heavy calculation load for the checking process and has a disadvantage in terms of preservation of privacy because it is possible to reproduce a fingerprint close to the original fingerprint image from the registered fingerprint data. However, the pattern type does not select the finger and is not sensitive to the roughening of the finger.

According to the first embodiment, since the registered fingerprint data is stored as the user data 234 in the auxiliary storage 23 of the client computer 2, freedom of choice is limited to adopting the minutiae type if the preservation of privacy is highly respected. This is because the client computer 2 is not under the strict management in contrast to the fingerprint authentication server 1 and thus there is a possibility of the client computer 2 being handed over to a malicious person due to a burglary or the like. However, if only the registered fingerprint data of the minutiae type is used, there is a problem that accuracy of the checking is reduced because of the fact that the minutiae type selects the finger and is sensitive to the roughening of the finger, as described above.

Therefore, according to the second embodiment, the minutiae type is used in cooperation with other pattern types or the like while the problem of a leak of information from the client computer 2 is prevented.

In the following, a case where the minutiae type is used in combination with the pattern type is described.

The overall configuration of the system is substantially the same as the configuration according to the first embodiment illustrated in FIG. 1.

The configuration of the fingerprint authentication server 1 is also substantially the same as the configuration according to the first embodiment illustrated in FIG. 2; however, the registered fingerprint data stored in the user data database 134 (see FIG. 3) includes data of the minutiae type (referred to as "registered minutiae data") and data of the pattern type (referred to as "registered pattern data").

Further, the hash value table 121 created in the main storage 12 includes items "order", "user ID hash value" and "registered minutiae data hash value". The "order" and the "user ID hash value" are substantially the same as those according to the first embodiment illustrated in FIG. 4. The "registered minutiae data hash value" indicates a hash value calculated based on the registered minutiae data of the user data database 134 using the hash function such as SHA-2, etc.

Further, the fingerprint authentication program 133 is configured to check minutiae data of the check fingerprint data (referred to as "check minutiae data") against the registered minutiae data and check pattern data of the check fingerprint data (referred to as "check pattern data") against the registered pattern data.

The configuration of the client computer 2 is also substantially the same as the configuration according to the first embodiment illustrated in FIG. 6; however, the user data 234 stored in the auxiliary storage 23 includes the registered minutiae data only. Thus, the user data 234 stored in the auxiliary storage 23 includes a pair(s) of the user ID and the registered minutiae data.

Further, the fingerprint data generating program 232 is configured to generate the check minutiae data and the check pattern data based on the acquired fingerprint image.

Further, the fingerprint authentication program 233 may only check the check minutiae data against the registered minutiae data.

Next, operations according to the second embodiment are described.

Figure 11:
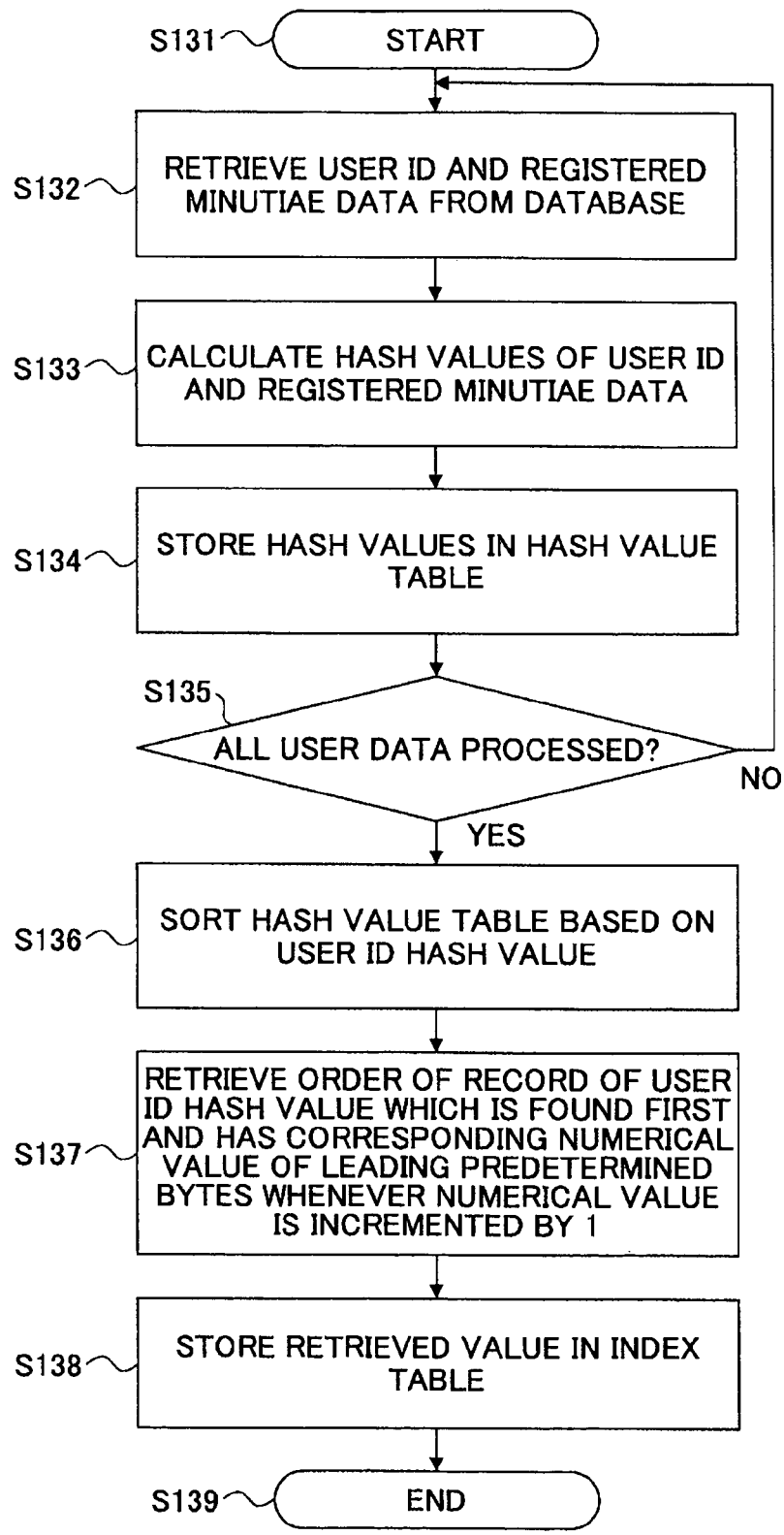
FIG. 11 is a flowchart illustrating an example of a process for generating the hash value table 121 and the index table 122 according to the second embodiment.

FIG. 11 is a flowchart illustrating an example of a process for generating the hash value table 121 and the index table 122 according to the second embodiment. It is noted that the generation of the hash value table 121 and the index table 122 are performed after the user data database 134 is generated. This process is performed just before the system goes into service after the registration of the user data in the user data database 134 is completed. Further, the hash value table 121 and the index table 122 need to be generated again when the user data is added or deleted. In this case, it is desirable that the hash value table 121 and the index table 122 are generated again at the time which is shifted from the peak time, such as when the fingerprint authentication server 1 is not under heavy load conditions.

In FIG. 11, the calculation device 11 of the fingerprint authentication server 1 starts the process (step s131), and retrieves one item of the user data which includes a pair of the user ID and the registered minutiae data from the user data database 134 using the database program 131 (step s132).

Next, the calculation device 11 calculates the hash value of the retrieved user ID and the hash value of the retrieved registered minutiae data, respectively, using the hash function such as SHA-2, etc. (step s133).

Next, the calculation device 11 stores the calculated hash value of the user ID as a user ID hash value and the calculated hash value of the registered minutiae data as a registered minutiae data hash value in the hash value table 121 (step s134).

Next, the calculation device 11 determines whether all the user data has been processed (step s135), and if all the user data has not been processed yet (No in step s135), it returns to the retrieving process of the user data (step s132).

If all the user data has been processed (Yes in step s135), the calculation device 11 sorts the data in the hash value table 121 in ascending order based on the user ID hash values (step s136).

Next, the calculation device 11 performs a search in the hash value table 121 from the beginning to retrieve and record the order of the record of the user ID hash value which is found first whenever the leading numerical value, which corresponds to a predetermined number of bytes (two byte, for example) of the user ID hash value in the hash value table 121, is incremented by 1 (step s137). In the case of the predetermined number of bytes being two bytes, the process is performed from the leading numerical value "0000" to "FFFF".

Next, the calculation device 11 stores the retrieved values of the order of records in the index table 122 such that they are associated with the corresponding leading numerical values (step s138), and terminates the process (step s139).

It is noted that the hash value table 121 is sorted in ascending order (step s136) and the order of the first record of the user ID hash value whose first predetermined number of bytes correspond to the numerical value which is incremented by 1 is retrieved (step s137); however, the hash value table 121 may be sorted in descending order and the order of the first record of the user ID hash value whose first predetermined number of bytes correspond to the numerical value which is decremented by 1 from the maximum value may be retrieved. This depends on whether the search in the index table 122 is performed in ascending order of the user hash value or descending order of the user hash value after the system goes into service.

Next, a fingerprint authentication process between the client computer 2 and the fingerprint authentication server 1 after the system goes into service is described. It is noted that the individual processes of the client computer 2 and the fingerprint authentication server 1 are described later, and at first, the processes across both of them are described. Further, as an example, the fingerprint authentication is applied to a log-in operation in the client computer 2; however, the result of the fingerprint authentication may be used for any purpose. For example, the fingerprint authentication may be used for management of arrivals and departures, by using the client computers 2 as computers provided at an entrance and an exit of a facility.

First of all, a user inputs a user ID to the client computer 2 via the input/output device 25 and inputs an authentication image to the client computer 2 by placing his/her finger on the fingerprint sensor 26. The client computer 2 compares the input user ID with the user ID of the user data 234 stored in the auxiliary storage 23. Normally, these correspond to each other. In some cases such as a case where a separate user tries to log in to the client computer 2 for the purpose of maintenance, etc., these do not correspond. These cases are described later. At first, the case in which these user IDs correspond to each other is described.

If these user IDs correspond to each other, the user ID hash value and the registered minutiae data hash value of the user data 234 in the auxiliary storage 23 are calculated. Recently, it has been ordinary that a computer, which may be used as a client computer 2, has a processing capability equivalent to an ordinary server. Thus, this process is completed nearly instantaneously. After the calculation of the hash values, the client computer 2 establishes the encryption communication line to the fingerprint authentication server 1. The client computer 2 transmits the user ID hash value and the registered minutiae data hash value via the communication device 24.

In the fingerprint authentication server 1, the search in the index table 122 and the hash value table 121 is performed using the user ID hash value transmitted from the client computer 2. After the search is completed, the comparison process of the registered minutiae data hash value is performed. A result of this process includes the following items (1) through (3).

(1) The corresponding user ID hash value is found and the registered minutiae data hash values correspond to each other (i.e., a normal situation).

(2) The corresponding user ID hash value is found but the registered minutiae data hash values do not correspond to each other.

(3) The corresponding user ID hash value is not found.

The fingerprint authentication server 1 transmits the processing result to the client computer 2.

The client computer 2 branches among the processes according to the processing result. In the following, the process in response to the processing result (1) is described, and the remaining processes are described later.

In a normal situation, the processing result (1) is transmitted. In this case, the client computer 2 generates the check fingerprint data (i.e., the check minutiae data and the check pattern data) from the fingerprint image, and performs a first stage fingerprint check process by checking the generated check minutiae data against the registered fingerprint data of the user data 234 in the auxiliary storage 23. The check result includes the following items (1-1) through (1-3).

(1-1) With the first stage fingerprint check process, it is determined that the check minutiae data corresponds to the registered fingerprint data.

(1-2) As a result of the first stage fingerprint check process, it is not clear whether the check minutiae data corresponds to the registered fingerprint data. Thus, it is determined that a first stage fingerprint check process using the pattern type is necessary.

(1-1) With the first stage fingerprint check process, It is determined that the check minutiae data does not correspond to the registered fingerprint data.

If the check result is the item (1-1), the client computer 2 closes the encryption communication line and starts the log-in process. If the result is the item (1-3), the client computer 2 returns to the acquiring process of the user ID and the fingerprint image.

If the result is the item (1-2), the client computer 2 transmits the user ID and the check pattern data to the fingerprint authentication server 1.

The fingerprint authentication server 1, which receives the user ID and the check pattern data, searches for the corresponding user ID in the user data database 134 based on the received user ID to retrieve the registered fingerprint data associated with the user. Then, the fingerprint authentication server 1 performs a pattern check again by checking the received check pattern data against the registered pattern data of the retrieved registered fingerprint data. Then, the fingerprint authentication server 1 transmits the check result (match or mismatch) to the client computer 2.

If the received check result represents the match, the client computer 2 closes the encryption communication line and starts the log-in process. If the received check result represents the mismatch, the client computer 2 returns to the acquiring process of the user ID and the fingerprint image.

Next, a case where the input user ID does not correspond to the user ID of the user data 234 in the auxiliary storage 23 is described. In this case, at first, the check fingerprint data (i.e., the check minutiae data and the check pattern data) is generated from the fingerprint image. Next, the client computer 2 establishes the encryption communication line to the fingerprint authentication server 1 to transmit the user ID and the check fingerprint data.

In the fingerprint authentication server 1, the search process in the user data database 134 and the checking processes, which include a minutiae checking process based on the minutiae features and a pattern checking process based on the pattern features, are performed based on the transmitted user ID and the check fingerprint data. If there is correspondence, the result representing the match as well as the registered minutiae data are transmitted to the client computer 2. If there is not correspondence, only the result representing the mismatch is transmitted to the client computer 2.

In response to the result representing the match, the client computer 2 additionally stores the user ID and the transmitted registered minutiae data in the user data 234 in the auxiliary storage 23. Now, from the next time, this user can perform the checking process at the client computer 2. The client computer 2 closes the encryption communication line and starts the log-in process. If the received check result represents the mismatch, the client computer 2 returns to the acquiring process of the user ID and the fingerprint image.

Next, a process in the case where the processing result (2) is transmitted from the fingerprint authentication server 1 after the client computer 2 transmits the hash values is described. In response to this processing result, at first, the client computer 2 generates the check fingerprint data (i.e., the check minutiae data and the check pattern data) from the input fingerprint image. Next, the client computer 2 transmits the user ID and the check fingerprint data to the fingerprint authentication server 1.

In the fingerprint authentication server 1, the search process in the user data database 134 and the checking processes, which include a minutiae checking process based on the minutiae features and a pattern checking process based on the pattern features, are performed based on the transmitted user ID and the check fingerprint data. If there is correspondence, the result representing the match as well as the registered minutiae data are transmitted to the client computer 2. If there is not correspondence, only the result representing the mismatch is transmitted to the client computer 2.

In response to the result representing the match, the client computer 2 overwrites the current registered fingerprint data in the user data 234 with the transmitted registered minutiae data. Now, from the next time, this user can perform the checking process at the client computer 2 as usual. The client computer 2 closes the encryption communication line and starts the log-in process. If the received check result represents the mismatch, the client computer 2 returns to the acquiring process of the user ID and the fingerprint image.

Next, a process in the case where the processing result (3) is transmitted from the fingerprint authentication server 1 after the client computer 3 transmits the hash values is described. In this case, since there is no qualification to log in to the client computer 2, the client computer 2 regards it as a failure in checking process and returns to the acquiring process of the user ID and the fingerprint image.

Next, the individual processes of the client computer 2 and the fingerprint authentication server 1 are described using flowcharts.

The processes at the time of the fingerprint authentication in the client computer 2 are substantially the same as those according to the first embodiment illustrated in FIGS. 8A through 8F; however, there are slight differences.

At first, in step s205 in FIG. 8A, the calculation device 21 calculates the hash value of the user ID (i.e., the user ID hash value) and the hash value of the registered minutiae data (i.e., the registered minutiae data hash value) which is paired with the user ID.

Further, in step s220 in FIG. 8C, the calculation device 21 adds the registered minutiae data, which is transmitted from the fingerprint authentication server 1 together with the processing result representing the success of the authentication, in the user data 234 such that the registered fingerprint data is paired with the user ID which succeeds in the authentication this time.

Figure 12:
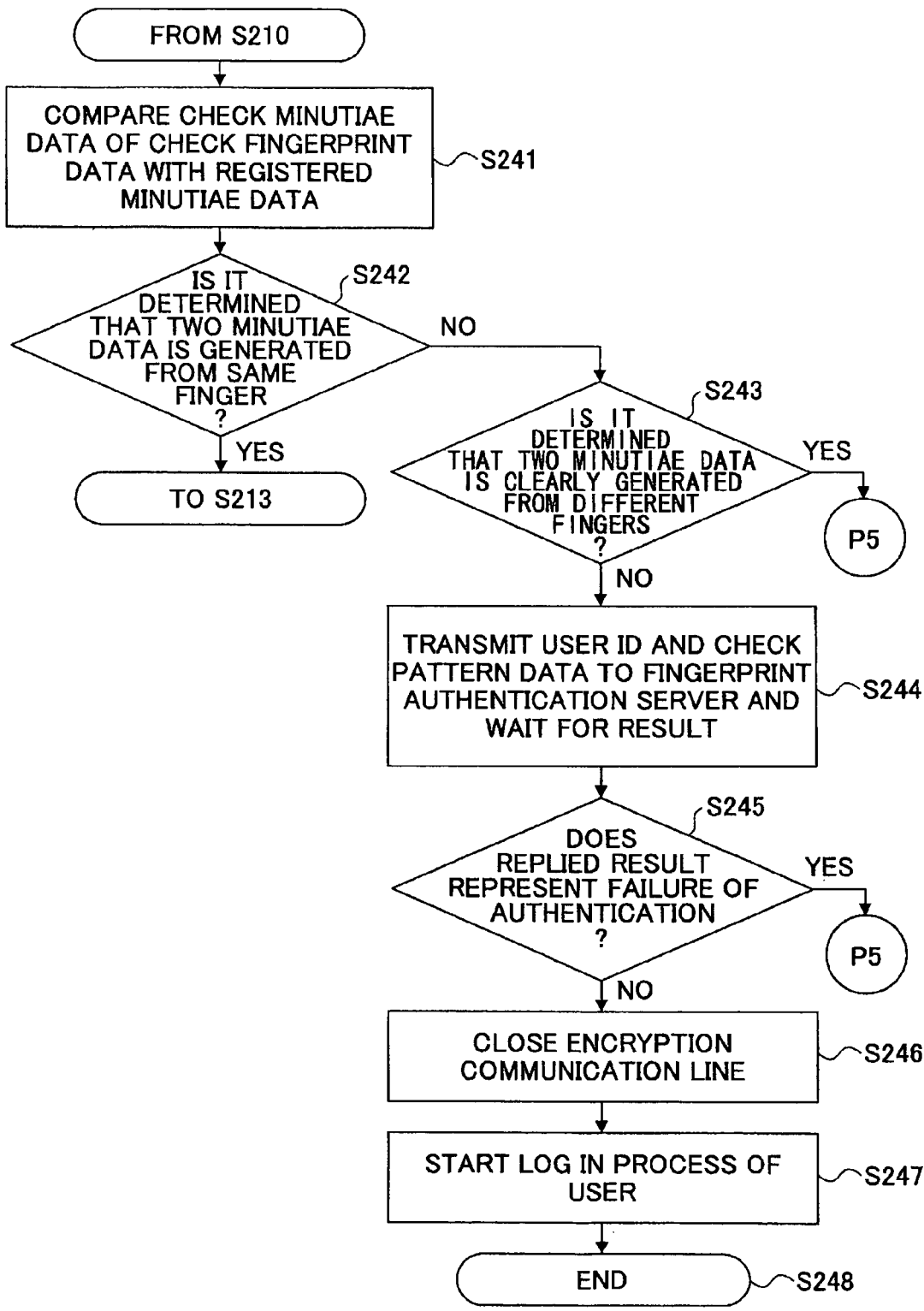
FIG. 12 is a flowchart illustrating an example of processes at the time of fingerprint authentication in the client computer 2 according to the second embodiment.

Further, steps s211 and s212 between steps s210 and s213 are illustrated in FIG. 12.

In FIG. 12, after step s210, the calculation device 21 of the client computer 2 determines whether the check minutiae data of the generated check fingerprint data and the registered minutiae data already acquired are originated from the same finger using the fingerprint authentication program 233 (steps s241, s242).

If it is determined that these items of the data are originated from the same finger (Yes in step s242), the process routine goes to step s213.

If it is not determined that these items of the data are originated from the same finger (No in step s242), the calculation device 21 determines whether these items of the data are clearly originated from different fingers (step s243). If it is determined that these items of the data are clearly originated from different fingers (Yes in step s243, P5), the process routine goes to the process illustrated in FIG. 8F.

If it is not determined that these items of the data are clearly originated from different fingers (i.e., an ambiguous state), the calculation device 21 transmits the user ID and the check pattern data to the fingerprint authentication server 1 and then waits for the result (steps s244, s245).

If the result transmitted from the fingerprint authentication server 1 represents the failure of the authentication (Yes in step s245, P5), the process routine goes to the process illustrated in FIG. 8F.

If the result transmitted from the fingerprint authentication server 1 does not represent the failure of the authentication (No in step s245), the calculation device 21 closes the encryption communication line with the fingerprint authentication server 1 (step s246), starts the log-in process (step s247) and terminates the process (step s248).

It is noted that if only the minutiae data is used, there may be a case where even the same finger results in the failure of the authentication, depending on how the fingerprint image is captured. Thus, according to the process routine described above, even if the check is successfully performed, the registered minutiae data is not replaced.

The processes at the time of the fingerprint authentication in the fingerprint authentication server are substantially the same as those according to the first embodiment illustrated in FIGS. 9A through 9F; however, there are slight differences.

Figure 13:
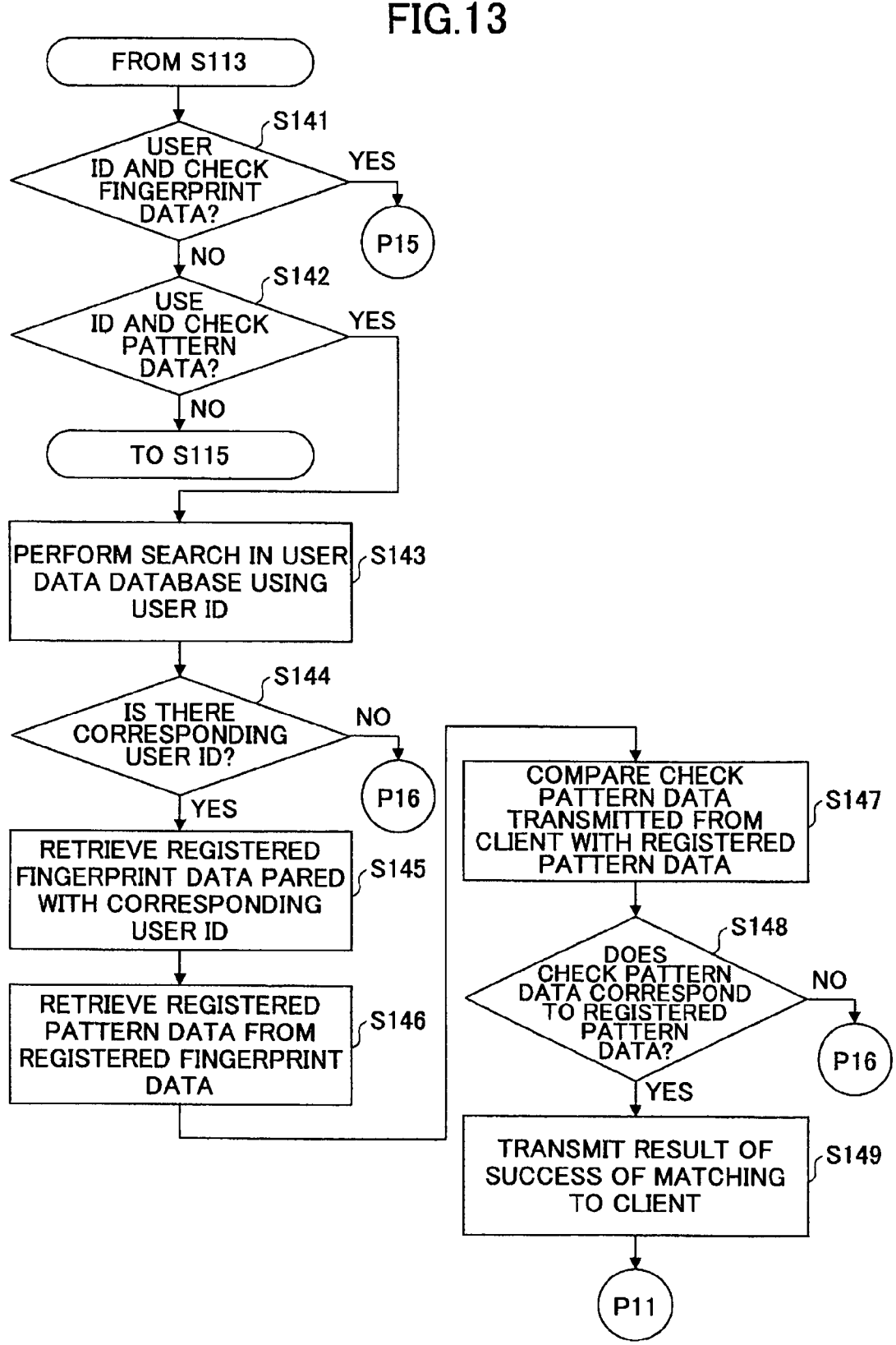
FIG. 13 is a flowchart illustrating an example of processes at the time of fingerprint authentication in the fingerprint authentication server 1 according to the second embodiment.

Step s114 between steps s113 and s115 are illustrated in FIG. 13.

In FIG. 13, after step s113, the calculation device 11 of the fingerprint authentication server 1 determines whether the data from the client computer 2 is the user ID and the check fingerprint data (i.e., the check minutiae data and the check pattern data) (step s141). If the data from the client computer 2 is the user ID and the check fingerprint data (Yes in step s141, P15), the process routine goes to the process illustrated in FIG. 9E.

If the data from the client computer 2 is not the user ID and the check fingerprint data (No in step s141), the calculation device 11 determines whether the data from the client computer 2 is the user ID and the check pattern data (step s142). If the data from the client computer 2 is not the user ID and the check pattern data (No in step 142), the process routine goes to step s115.

If the data from the client computer 2 is the user ID and the check pattern data (Yes in step 142), the calculation device 11 performs the search in the user data database 134 based on the user ID using the database program 131 (steps s143, s144).

As a result of the search, if there is no corresponding user ID in the user data database 134 (No in step s144, P16), the process routine goes to the process illustrated in FIG. 9F.

As a result of the search, if there is the corresponding user ID (Yes in step s144), the calculation device 11 retrieves the registered fingerprint data which is paired with the user ID (step 145).

Next, the calculation device 11 retrieves the registered pattern data from the registered fingerprint data (step s146).

Next, the calculation device 11 determines whether the retrieved registered pattern data and the check pattern data transmitted from the client computer 2 are generated from the same finger using the fingerprint authentication program 133 (steps s147, s148).

As a result of the determination if the check pattern data does not correspond to the registered pattern data (No in step 148, P16), the process routine goes to the process illustrated in FIG. 9F.

As a result of the determination if the check pattern data corresponds to the registered pattern data (Yes in step 148), the calculation device 11 transmits the processing result representing the success of the correspondence to the client computer 2 (step s149), and the process routine goes to step s112 (P11) illustrated in FIG. 9A.

As described above, according to the present embodiments, there are advantages as follows.

At first, according to the present embodiments, the hash value table and the index table are created based on the registered user IDs and registered fingerprint data in advance, and are stored in the memory. Further, the client computer 2 stores a user ID and registered fingerprint data of a user(s) who uses the client computer 2 frequently.

In order to perform the fingerprint authentication, the input user ID is checked against the user ID stored in the client computer 2, and if they correspond to each other, the hash value of the user data is transmitted to the fingerprint authentication server 1. In the fingerprint authentication server 1, it is determined whether the user data in the client computer 2 corresponds to the user data in the fingerprint authentication server 1 based on the hash value table in the memory. If it is determined that the user data in the client computer 2 corresponds to the user data in the fingerprint authentication server 1, the checking process is performed in the client computer 2.

As a result of this, among the following causes of a heavy load on an ordinary fingerprint authentication server,
(1) establishment of the encryption communication line between the client computer and the server;
(2) a search with a database of user data; and
(3) an execution of fingerprint matching, the items (2) and (3) can be eliminated. Therefore, the load on the fingerprint authentication server 1 is reduced greatly and thus hardware cost is reduced.

Further, a user who has not been registered in the client computer 2 is authenticated in the fingerprint authentication server 1. Thus, if the user is registered in the fingerprint authentication server 1, the user can log in to a client computer 2 in which user data of the user is not registered. Therefore, the fingerprint authentication server can maintain the advantage of central management which is a feature of a client-server type system. Further, if the user is authenticated successfully, the user data of the user is added to the client computer 2. Thus, from the next time, the user can be authenticated on the client computer 2. Therefore, the number of new users is always limited and thus there is not such a situation where the fingerprint authentication server 1 cannot respond due to the heavy load.

Further, if the registered fingerprint data of the user is updated in the fingerprint authentication server 1, the fingerprint authentication server 1 can perform the authentication process. Further, if the authentication is successful, the registered fingerprint data is updated in the client computer 2. During the service of the system, the operations of updating the registered fingerprint data are not performed so often. There is substantially no influence on the overall load even if the authentication for the updated users is performed in the fingerprint authentication server 1. Therefore, the fingerprint authentication server can maintain the advantage of central management which is a feature of a client-server type system. Further, if the authentication is successful, the registered fingerprint data is updated so that, from the next time, the authentication can be performed on the client computer 2. Therefore, the number of users whose user data is not synchronized between the client computer 2 and the fingerprint authentication server 1 is always limited and thus there is not such a situation where the fingerprint authentication server 1 cannot respond due to the heavy load.

Further, the fingerprint authentication server 1 according to the second embodiment, only the minutiae data of the registered fingerprint data is stored in the client computer 2. The minutiae data cannot be used to reproduce the original fingerprint image. Therefore, the preservation of privacy is highly respected.

If the client computer 2 includes the minutiae data of the registered fingerprint data of a user who is going to log in to the client computer 2, the client computer 2 performs a first stage fingerprint check process. In a hybrid system of the minutiae system and the pattern system, more than 90% of the users can be checked based on the minutiae data. Thus, the fingerprint authentication server 1 need not perform the fingerprint authentication process frequently to obtain the result of the match or mismatch. As a result of this, although the load on the fingerprint authentication server 1 is increased in comparison with the first embodiment, the fingerprint authentication can be performed at higher speed and with a guarantee of privacy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A fingerprint authentication server device comprising:
a database in which user IDs and registered fingerprint data of plural users are stored; and a storage in which a hash value table is stored, the hash value table including user hash values of the user IDs and the registered fingerprint data of the users, wherein the fingerprint authentication server device is configured to receive a hash value of a user ID of a user to be authenticated and a hash value of the registered fingerprint data associated with the user ID from a client computer; perform a search in the hash value table to determine whether there are hash values corresponding to the received hash values in the hash value table; and transmit a determination result to the client computer, thereby to cause the client computer to perform a fingerprint authentication process for a user for which correspondence of the hash values has been confirmed.

2. The fingerprint authentication server device as claimed in claim 1, further comprising an index table which is used to perform a search in the hash value table.

3. The fingerprint authentication server device as claimed in claim 1, wherein the fingerprint authentication server device is further configured to receive a user ID of a user to be authenticated and fingerprint data to be checked from the client computer, wherein the fingerprint data is generated from a fingerprint image acquired from the user; check the user ID and the fingerprint data against data in the database; and transmit a check result to the client computer.

4. The fingerprint authentication server device as claimed in claim 3, wherein the fingerprint authentication server device is further configured to transmit the registered fingerprint data against which the fingerprint data transmitted from the client computer is checked as well as the check result if the check result represents correspondence, thereby to cause the client computer to store the registered fingerprint data such that it is associated with the user ID.

5. The fingerprint authentication server device as claimed in claim 1, wherein the registered fingerprint data in the database includes registered fingerprint minutiae data to be checked based on a minutiae feature and registered fingerprint pattern data to be checked based on a pattern feature.

6. A client computer comprising:

a storage in which a user ID and registered fingerprint data are stored; wherein the client computer is configured to calculate a hash value of a user ID input from a user to be authenticated and a hash value of the registered fingerprint data associated with the input user ID in the storage; transmit the hash values to a fingerprint authentication server and to perform a fingerprint authentication based on the registered fingerprint data stored in the storage and a fingerprint data generated from a fingerprint image acquired from the user if the client computer receives from the fingerprint authentication server a check result which represents that correspondence of the hash values has been confirmed.

7. The client computer as claimed in claim 6, wherein the client computer is further configured to transmit a user ID of a user to be authenticated and fingerprint data to be checked to the fingerprint authentication server if there is no corresponding user ID stored in the storage, wherein the fingerprint data to be checked is generated from a fingerprint image acquired from the user; and request the fingerprint authentication server to perform the fingerprint authentication based on the fingerprint data to be checked.

8. The client computer as claimed in claim 7, wherein the client computer is further configured to store registered fingerprint data, which is transmitted together with a result of the fingerprint authentication from the fingerprint authentication server, in the storage such that it is associated with the user ID related to the request.

9. The client computer as claimed in claim 6, wherein the client computer is further configured to transmit a user ID of a user to be authenticated and fingerprint data to be checked to the fingerprint authentication server if the check result from the fingerprint authentication server represents that there is correspondence of the hash value of the user ID but no correspondence of the hash value of the registered fingerprint data, wherein the fingerprint data to be checked is generated from a fingerprint image acquired from the user; and request the fingerprint authentication server to perform the fingerprint authentication based on the fingerprint data to be checked.

10. The client computer as claimed in claim 9, wherein the client computer is further configured to overwrite the current registered fingerprint data with registered fingerprint data, which is transmitted together with a result of the fingerprint authentication from the fingerprint authentication server, in the storage such that it is associated with the user ID related to the request.

11. The client computer as claimed in claim 6, wherein the registered fingerprint data stored in the storage is registered fingerprint minutiae data to be checked based on a minutiae feature.

12. A fingerprint authentication method in a fingerprint authentication server, the fingerprint authentication method comprising:

providing a database in which user IDs and registered fingerprint data of plural users are stored, and a hash value table including user hash values of the user IDs and the registered fingerprint data of the users;

receiving a hash value of a user ID of a user to be authenticated and a hash value of registered fingerprint data associated with the user ID from a client computer;

determining whether there are hash values corresponding to the received hash values in the hash value table; and transmitting a determination result to the client computer, thereby to cause the client computer to perform a fingerprint authentication process for a user for which correspondence of the hash values has been confirmed.

* * * * *

UNITED STATES PATENT AND TRADEMARK OFFICE
CERTIFICATE OF CORRECTION

PATENT NO. : 8,549,599 B2  
APPLICATION NO. : 13/200943  
DATED : October 1, 2013  
INVENTOR(S) : Satoshi Semba Page 1 of 1

It is certified that error appears in the above-identified patent and that said Letters Patent is hereby corrected as shown below:

On the Title Page, Item (56), in Column 2 (Other Publications), Line 6, Delete "2011." and insert -- 2009. --, therefor.

Signed and Sealed this
Twenty-fourth Day of December, 2013

Margaret A. Focarino
*Commissioner for Patents of the United States Patent and Trademark Office*